United States Patent
Vrancic

(10) Patent No.: US 7,114,091 B2
(45) Date of Patent: Sep. 26, 2006

(54) SYNCHRONIZATION OF DISTRIBUTED SYSTEMS

(75) Inventor: Aljosa Vrancic, Austin, TX (US)

(73) Assignee: National Instruments Corporation, Austin, TX (US)

( * ) Notice: Subject to any disclaimer, the term of this patent is extended or adjusted under 35 U.S.C. 154(b) by 612 days.

(21) Appl. No.: 10/389,784

(22) Filed: Mar. 17, 2003

(65) Prior Publication Data

US 2003/0177154 A1  Sep. 18, 2003

Related U.S. Application Data

(60) Provisional application No. 60/365,323, filed on Mar. 18, 2002.

(51) Int. Cl.
    *G06F 1/12* (2006.01)
(52) U.S. Cl. ..................................... 713/400
(58) Field of Classification Search ................ 713/400
    See application file for complete search history.

(56) References Cited

U.S. PATENT DOCUMENTS

| | | | |
|---|---|---|---|
| 5,293,374 A | 3/1994 | Eidson | |
| 5,566,180 A | 10/1996 | Eidson et al. | |
| 5,586,305 A | 12/1996 | Eidson et al. | |
| 5,774,377 A | 6/1998 | Eidson et al. | |
| 6,167,457 A | 12/2000 | Eidson et al. | |
| 6,205,362 B1 | 3/2001 | Eidson | |
| 6,252,445 B1 | 6/2001 | Eidson | |
| 6,256,477 B1 | 7/2001 | Eidson et al. | |
| 6,278,710 B1 | 8/2001 | Eidson | |
| 6,370,159 B1 | 4/2002 | Eidson | |
| 6,512,990 B1 | 1/2003 | Woods et al. | |
| 6,654,356 B1 | 11/2003 | Eidson | |
| 6,665,316 B1 | 12/2003 | Eidson | |
| 6,741,952 B1 | 5/2004 | Eidson | |
| 6,975,656 B1 * | 12/2005 | Madhavapeddi et al. | ... 370/518 |
| 2005/0144309 A1 * | 6/2005 | Gish | ......................... 709/233 |

* cited by examiner

*Primary Examiner*—Chun Cao
*Assistant Examiner*—Mark Connolly
(74) *Attorney, Agent, or Firm*—Meyertons Hood Kivlin Kowert & Goetzel, P.C.; Jeffrey C. Hood

(57) ABSTRACT

A system may include a communication medium, a master node, and a slave node. The master node may send several sets of synchronization messages on the communication medium. Each set of synchronization messages includes several synchronization messages. The slave node may receive each set of synchronization messages and to select a synchronization message having an optimal delay from each set of synchronization messages. The slave node may calculate a correction for a slave clock included in the slave node in response to timing information associated with the synchronization message having the optimal delay in each set. The slave node may not calculate a correction for the slave clock in response to timing information associated with at least some of the synchronization messages in each set. The communication medium may convey at least one synchronization message within each of the sets with a minimum delay.

55 Claims, 13 Drawing Sheets

FIG. 3

| Set of Synchronization Messages 1 - 5 | | Delay |
|---|---|---|
| Synchronization Message 1 | Sent at $t_C$ = 100 from 22C | |
| | Received at $t_B$ = 111 at 22B | delay = 11 |
| | Received at $t_A$ = 108 at 22A | delay = 8 |
| Synchronization Message 2 | Sent at $t_C$ = 200 from 22C | |
| | Received at $t_B$ = 217 at 22B | delay = 17 |
| | Received at $t_A$ = 220 at 22A | delay = 20 |
| Synchronization Message 3 | Sent at $t_C$ = 300 from 22C | |
| | Received at $t_B$ = 314 at 22B | delay = 14 |
| | Received at $t_A$ = 315 at 22A | delay = 15 |
| Synchronization Message 4 | Sent at $t_C$ = 400 from 22C | |
| | Received at $t_B$ = 409 at 22B | delay = 9 |
| | Received at $t_A$ = 409 at 22A | delay = 9 |
| Synchronization Message 5 | Sent at $t_C$ = 500 from 22C | |
| | Received at $t_B$ = 508 at 22B | delay = 8 |
| | Received at $t_A$ = 510 at 22A | delay = 10 |

SYNCHRONIZATION OF DISTRIBUTED SYSTEMS

CROSS-REFERENCE TO RELATED APPLICATIONS

This application claims the benefit of U.S. Provisional Application No. 60/365,323, filed Mar. 18, 2002, titled "Synchronization of Distributed Systems on Ethernet."

BACKGROUND OF THE INVENTION

1. Field of the Invention

This invention relates to instrumentation and computing systems and, more particularly, to synchronizing devices in instrumentation and/or computing systems.

2. Description of the Related Art

Time-triggered control is often used to synchronize real-time computing systems. In a time-triggered system, all activities are carried out at certain predesignated points in time. To achieve this, nodes in time-triggered systems have a common notion of time, typically through the use of synchronized clocks in each node.

One type of system that may be controlled according to a time-triggered or event-triggered control system is an instrumentation system. An instrument is a device that collects data or information from an environment or unit under test (UUT) and displays this information to a user. An instrument may also analyze and process acquired data prior to displaying the data to the user. Some instruments may be used to provide test stimuli to a UUT. Examples of instruments include oscilloscopes, digital multimeters, pressure sensors, arbitrary waveform generators, digital waveform generators, etc. The information that may be collected by respective instruments includes information describing voltage, resistance, distance, velocity, pressure, frequency of oscillation, humidity, or temperature, among others.

Computer-based instrumentation systems typically include transducers for transducing a physical phenomenon into an electrical signal, signal conditioning logic to perform amplification, isolation, and/or filtering, and analog-to-digital (A/D) conversion logic for receiving analog signals and providing corresponding digital signals to the host computer system.

In a computer-based system, the instrumentation hardware or device is typically an expansion board plugged into one of the I/O slots of the computer system. In another common instrumentation system configuration, the instrumentation hardware is coupled to the computer system via other means such as through a VXI (VME eXtensions for Instrumentation) bus, a PXI (PCI eXtensions for Instrumentation) bus, a GPIB (General Purpose Interface Bus), a serial port or bus, or parallel port of the computer system. The instrumentation hardware may include a DAQ board, a computer-based instrument such as a multimeter, or another type of instrumentation device.

Modern instrumentation systems may also include networked measurement systems. In a networked measurement system, two or more instrumentation or measurement devices may be coupled over a network and may operate together to perform a instrumentation or measurement function.

Some computer-based and/or network-based instrumentation systems include several instrumentation and/or DAQ devices. Each device may generate and/or capture data. Other resources within the system may process captured data. In order to synchronize devices within an instrumentation system so that data may be accurately generated, captured, and/or processed, it may be desirable to use a time-triggered control system to synchronize the instrumentation system devices to a common time. While existing synchronization schemes currently exist, it is desirable to have improved synchronization systems. Such a synchronization scheme may also be desirable in other systems, such as control and monitoring systems.

SUMMARY

Various embodiments of a method and system for synchronizing nodes in a distributed system are disclosed. In some embodiments, a system may include a communication medium, a master node, and a slave node. The master node may be configured to send several sets of synchronization messages on the communication medium. Each set of synchronization messages includes several synchronization messages. The slave node may be configured to receive each set of synchronization messages and to select a synchronization message having an optimal delay from each set of synchronization messages. The slave node may be configured to calculate a correction for a slave clock included in the slave node in response to timing information associated with the synchronization message having the optimal delay in each set. The slave node may be configured to not calculate a correction for the slave clock in response to timing information associated with at least some of the synchronization messages in each set. The communication medium may be configured to convey at least one synchronization message within each of the sets with a minimum delay.

The master node may be configured to include a timestamp in each synchronization message in each of the sets. The timing information used to calculate the correction for the slave clock may include the timestamp included in the synchronization message having the optimal delay in each set.

The slave node may be configured to generate a timestamp in response to receiving each synchronization message in each of the sets. The timing information used to calculate the correction for the slave clock may include the timestamp generated in response to receiving the synchronization message having the optimal delay in each set.

In one embodiment, the slave node may be configured to calculate an adjustment to apply to the slave clock by inputting a difference between a master timestamp difference and a slave timestamp difference into a control loop. The master timestamp difference is a difference between a timestamp included in the synchronization message having the optimal delay selected from a most recently received set and a timestamp included in the synchronization message having the optimal delay selected from a next most recently received set. The slave timestamp difference is a difference between a timestamp generated by the slave node in response to receiving the synchronization message having the optimal delay selected from the most recently received set and a timestamp generated by the slave node in response to receiving the synchronization message having the optimal delay selected from the next most recently received set.

The slave node may be configured to select the synchronization message having the optimal delay in each set by calculating a delay for each synchronization message in that set. The slave node may calculate the delay for each synchronization message by calculating a difference between a slave time at which the slave node received that synchronization message and a master time at which the master node sent that synchronization message.

The slave node may include a control loop configured to adjust the rate of the slave clock and a control loop configured to adjust the phase of the slave clock. The slave node may spread an adjustment to the phase of the slave clock over several rate correction cycles in which the rate of the slave clock is adjusted.

In some embodiments, a method may involve: a master node sending several sets of synchronization messages on a communication medium, where each of the sets includes several synchronization messages; a slave node receiving the sets of synchronization messages from the communication medium; the slave node selecting a synchronization message having an optimal delay from each of the sets; and the slave node calculating a correction for a slave clock in response to timing information associated with the synchronization message having the optimal delay in each of the sets. The slave node does not adjust the slave clock in response to timing information associated with at least some of the synchronization messages in each set. Program instructions executable to implement such a method may be stored on a computer accessible medium in some embodiments.

BRIEF DESCRIPTION OF THE DRAWINGS

A better understanding of the present invention can be obtained when the following detailed description is considered in conjunction with the following drawings, in which:

FIG. 3 illustrates how slave nodes may calculate delay for a set of synchronization messages received during a particular time interval, according to one embodiment.

Figure 1:
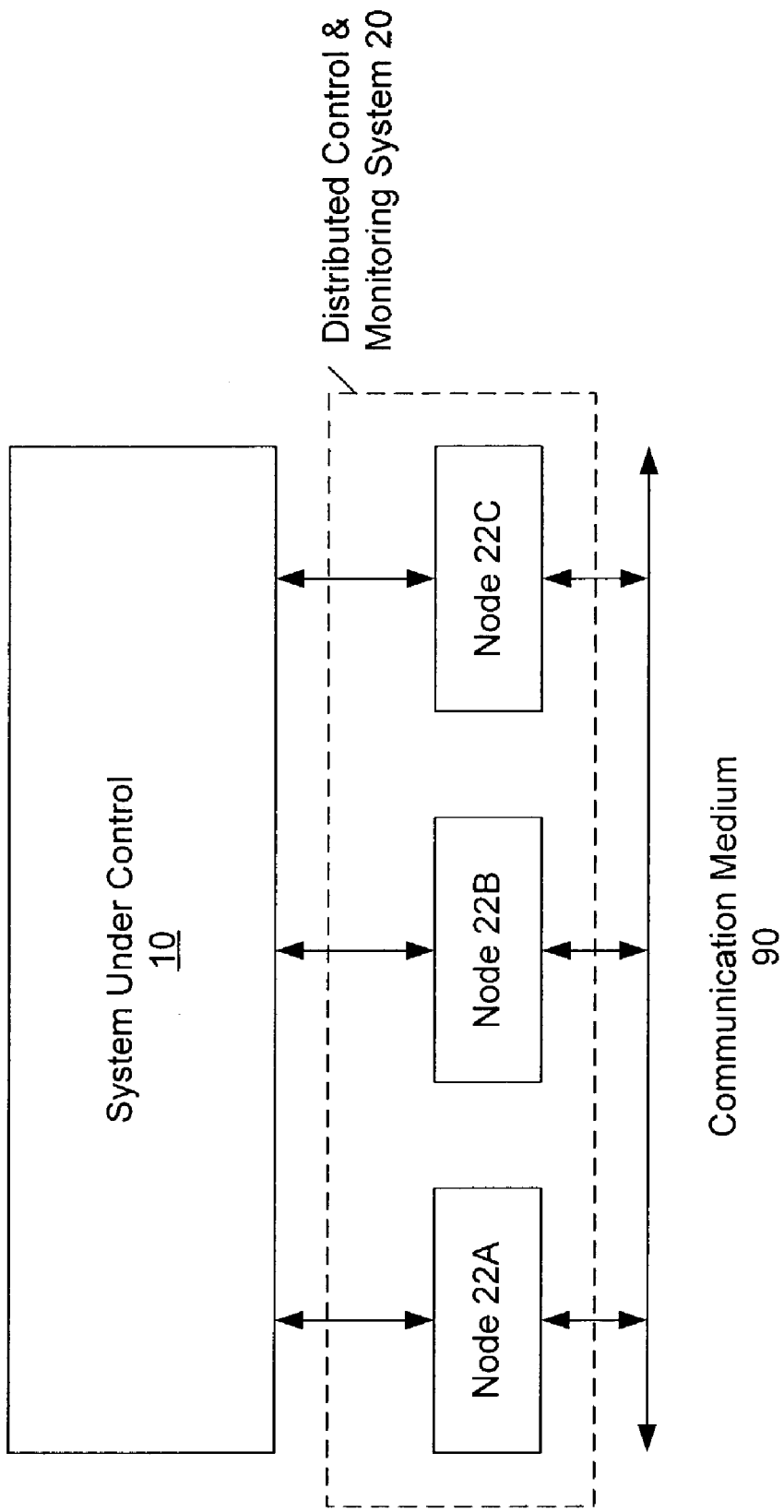
FIG. 1 illustrates an exemplary distributed control and monitoring system that is controlling and monitoring another system 10, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 illustrates an exemplary distributed control and monitoring system 20 (C&M system) that is controlling and monitoring another system 10 (system being controlled and monitored—bC&M system), according to one embodiment. The bC&M system 10 may be as simple as a single machine or as complicated as a whole factory. Distributed C&M system 20 includes nodes 22A–22C. Drawing elements such as nodes 22A–22C that are identified with a common numeral followed by a unique letter may be collectively referred to by that numeral alone (e.g., nodes 22). Nodes 22 may include various subsystems and/or intelligent nodes. Note that other embodiments may include fewer or additional nodes 22.

One or more nodes (e.g., node 22C) may also act as a master node by performing time-server duties. The non-time-server nodes (e.g., nodes 22A–22B) may be referred to as slave nodes. The master and slave nodes exchange messages via a communication medium 90. In one particular embodiment, the communication medium 90 may be a LAN (Local Area Network) (e.g., implemented using Ethernet technology). In another embodiment, the nodes may be connected via one or more different media implementing the IP (Internet Protocol) protocol.

In one particular embodiment, the nodes may want to exchange messages in order to handle the following cases:
  a) Node 22A receives a trigger from the bC&M system 10. The node 22A then records the time at which the trigger occurred and sends the recorded time to the other nodes 22B–22C in the C&M system 20. The other nodes 22B–22C may than use the recorded time to relate the trigger event on node 22A to other events happening in the system;
  b) Nodes 22A–22B may be required to execute respective control loops in substantially the same time intervals;
  c) Nodes 22A–22B may be required to execute respective control loops in substantially the same time intervals and with a predetermined delay from each other; and/or
  d) Nodes 22B–22C may be required to initiate execution of respectively algorithms at substantially the same time and/or at predetermined times.
  e) Node 22A may receive a trigger from the bC&M system 10. Node 22A then sends an event message to other nodes 22B and 22C as soon as possible so that the other nodes can take an appropriate action in reaction to the trigger signal received by node A 21. A quiet period in which only one node (e.g., node 22A) may access communication medium 90 may be enforced so that a potential event message can always propagate throughout the system within a known period of time. For example, if every 100 μs a 50 μs quiet period is enforced, a node that is authorized to send an event message may be able to do so within 100 μs from the moment of trigger detection.

To support scenarios such as these, a notion of a common time may be defined within the C&M system 20. In many embodiments, a common time t exists if for any two events Ei and Ej that happen on two different nodes 22A and 22B at the exactly same time, the two nodes will record event times tA and tB such that:

$$|tA-tB| < \epsilon A + B \qquad \text{Eq. 1}$$

The εA, εB represent maximum deviation (or jitter) of the time as measured by the nodes 22A and 22B from the common time. The common time can be measured in any unit (e.g., days, hours, minutes, seconds, milliseconds, etc.) that has dimension of time.

Figure 2:
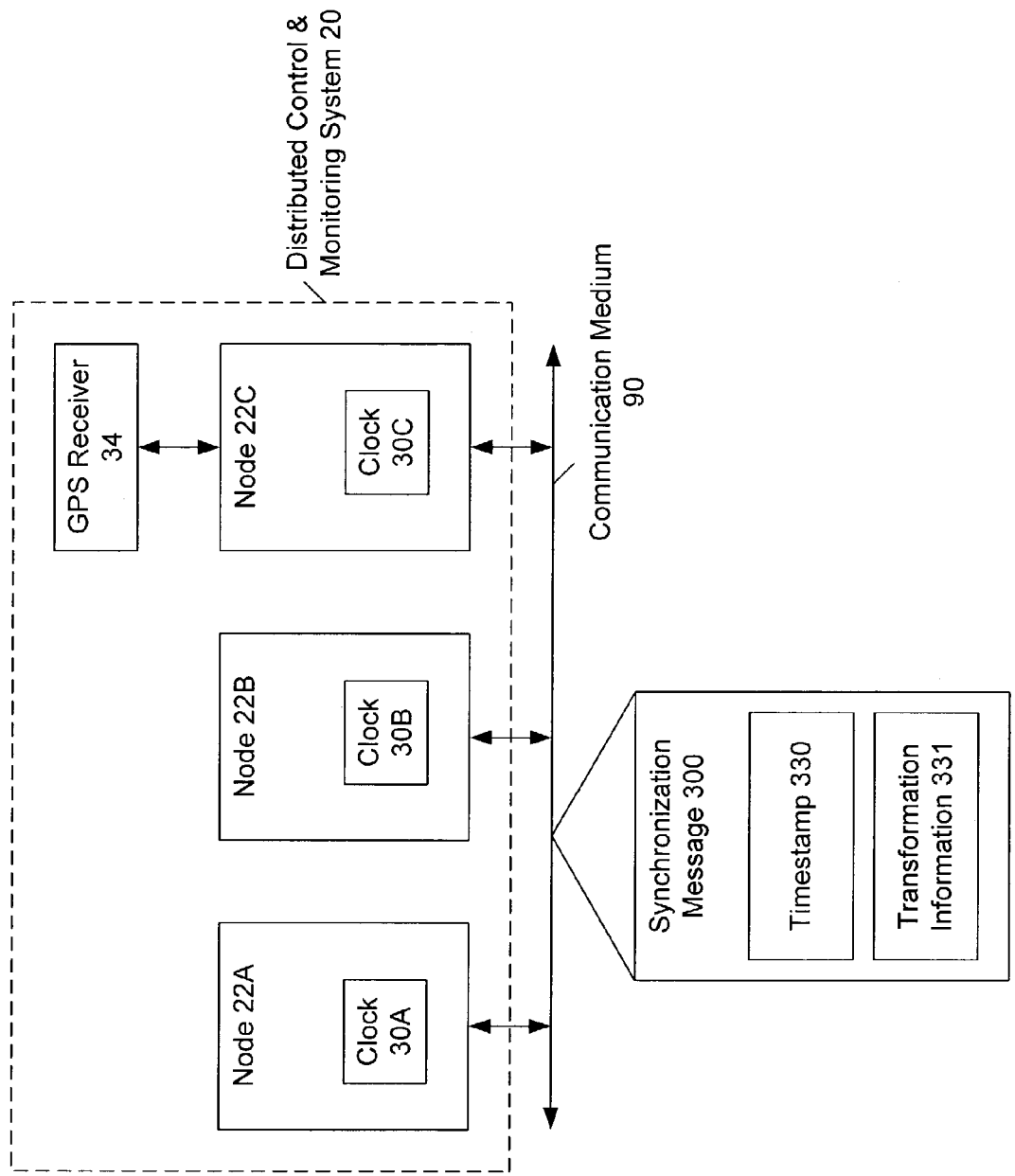
FIG. 2 illustrates a protocol that may be used to establish the notion of a common time within a distributed control and monitoring system, according to one embodiment.

FIG. 2 illustrates a protocol that may be used to establish the notion of a common time within a distributed C&M system in many embodiments. In this embodiment, each node 22 includes a local clock 30 (which may be a physical clock or a logical clock). The master node 22C occasionally or periodically reads its clock 30C to obtain a timestamp 330 (i.e., a point in time value of clock 30C). The master node 22C then includes the timestamp 330 in a synchronization message 300 that is broadcast over communication medium 90 to all other nodes 22A–22B in the system. The broadcast message 300 may arrive at each other node 22A–22B at substantially the same time. The recipients 22A and 22B may apply a mathematical algorithm to the timestamp 330 from the synchronization message 300 in order to calculate necessary adjustments for their clocks 30A and 30B, respectively.

In one embodiment, the clock 30C from which the timestamp 330 is derived becomes the source of the common time for the system 20. In other words, in such an embodiment, each slave node 22A–22B may apply an algorithm to the timestamp in order to synchronize their clocks to 30A and 30B to the master node's clock 30C. In other embodiments, a global time obtained from an external time source may become the common time. For example, in the illustrated system, the master node 22C obtains a global time via a GPS (Global Positioning System) receiver 34. In one embodiment, the master node 22C may synchronize its local clock 30C to the time provided by the GPS receiver prior to reading the timestamp 330. In another embodiment, the master node 22C may not synchronize local clock 30C to the time provided by the GPS receiver. Instead, the master node 22C may read the timestamp 330 and provide translation information 331 relative the timestamp to the time obtained via the GPS receiver to the slave nodes 22A–22B. Slave nodes 22A–22B may apply an algorithm to both the timestamp and the translation information 331 in order to calculate any adjustments to their respective local clocks 30A and 30B. The later embodiment may be used when the global-time also needs to be the common time but it may be beneficial for the timestamp to be expressed in different units. This protocol is well suited for scenarios for which the synchronization message 33 may be delayed for reasons beyond control of the time-server 30. For example, a synchronization message may be delayed if the communication media 90 is unavailable (e.g., because another node is using the communication media) when the synchronization message is to be sent. This is a common scenario on public Ethernet-based networks.

The common time may be established without the use of timestamps in some embodiments. For example, the master node 22C may communicate the synchronization message 300 on the communication medium 90 at a precisely known time intervals. The slave nodes 22A and 22B may then use their respective local clocks 30A and 30B to measure time relative to the latest synchronization message. The synchronization messages may be sent often enough that the differences in nodes 22A and 22B's clock rates are negligible. For example, if the maximum clock drift in a distributed C&M system is 100 ppm (ppm=pulse per minute) and the target jitter between any two simultaneous events as defined in equation Eq. 1 is 1 µs, the synchronization messages may be sent at least once every 10 ms. Embodiments in which the synchronization message transmission times can be controlled very precisely (e.g., in the above case, to better than 1 µs) may use this technique to establish a common time.

Synchronization

In many situations, synchronization messages 300 may experience varying delays on the communication medium 90. For example, when sending synchronization messages 300, the master node 22C may experience periods when access to the communication medium 90 is not readily available. Synchronization messages 300 sent during these periods may experience significantly longer delay than synchronization messages 300 sent during other periods. Similarly, some synchronization messages 300 may be delayed due to congestion on the communication medium 90, while other synchronization messages 300 may not be so delayed. Due to conditions such as these, slave nodes 22A–22B may be unable to precisely identify how much delay any given synchronization message 300 experienced. This may complicate synchronization, since a slave node 22A–22B may be unable to determine whether a significant difference between the time at which a given synchronization message 300 is sent and the time at which that synchronization message 300 is received is due to differences between the slave and master clocks or due to delay on the communication medium 90.

While some synchronization messages 300 may experience relatively lengthy delays on the communication medium 90, other synchronization messages 300 may experience minimal communication medium 90 delays. Slave nodes 22A–22B may selectively synchronize using synchronization messages 300 that experience less delay on the communication medium 90 by comparing the respective delays of several synchronization messages 300 received during a given time interval and selecting message(s) having the optimal delay for use in synchronization. The synchronization message having the optimal delay may, in many situations, be the synchronization message having the least delay. Non-selected synchronization messages having greater delays may be effectively discarded or ignored by a slave node. Thus, only some of the synchronization messages received during each time interval may be used by slave nodes to adjust the slave clocks.

In one embodiment, slave nodes 22A–22B may be configured to track time intervals T. Each interval may be non-overlapping with other time intervals. The communication medium 90 coupling the slave nodes to the master node 22C may be configured such that during each time interval T, each slave node 22A–22B will receive from the master node 22C at least one synchronization message 300 that has experienced a minimum communication delay (under normal operating circumstances). The duration of T may be selected based on characteristics of the communication medium 90, the configuration of the slave nodes and the master node, and/or historic traffic patterns experienced in the system. Within each time interval T, slave nodes 22A–22B may receive synchronization messages from the master node 22C and calculate the delay of each synchronization message received that time interval. The slave nodes may each analyze the delays of the synchronization messages received in each time interval to select a synchronization message having an optimal delay. The slave nodes may each compute a clock adjustment in response to timing information associated with the selected synchronization message.

For a given synchronization message frequency, the duration of each time interval T may be selected to balance a desired accuracy and precision. Allowing a longer interval increases the likelihood that one or more messages having optimal delays will be received, increasing the accuracy with which the deviation of the slave clock from the master clock can be identified. However, since longer intervals also decrease the frequency at which clock adjustments are calculated, longer intervals also increase the likelihood that the slave clock will experience a larger deviation from the master clock during each time interval, which may in turn decrease the precision with which the slave clock can be synchronized to the master clock at any given point in time.

FIG. 3 illustrates how slave nodes 22A and 22B may calculate delay for a set of synchronization messages received during a particular time interval, according to one embodiment. In the embodiment of FIG. 3, both slave nodes receive the same five synchronization messages 1–5 from the master node 22C in a time interval T. Note that in some embodiments, some slave nodes in a system may receive different synchronization messages during a given time interval than other slave nodes.

The first synchronization message is sent by the master node when the master node's clock has a value of 100. This value may be encoded in the synchronization message as a timestamp in some embodiments. In other embodiments, the times at which the master node sends synchronization messages may be specified (e.g., every 100 clock ticks of the master node's clock, beginning at t=0), and slave nodes may use this specification to determine when each synchronization message was sent by the master node. Slave node 22B receives the first synchronization message when its slave clock has a value of 111. Slave node 22A receives the first synchronization message when its slave clock has a value of 108. Each slave node 22A–22B may track both the time at which each synchronization message was sent by the master node 22C and the time at which that slave node received each synchronization message in order to calculate the delay of each synchronization message. Here, the delay is calculated as the difference between the time at which the slave node received the synchronization message (based on timing information from the slave node's slave clock) and the time at which the master node sent the synchronization message (based on the timing information from the master clock). Thus, for the first synchronization message, slave node 22B calculates a delay of 11 (111–100) and slave node 22A calculates a delay of 8 (108–100).

The next four synchronization messages are sent by the master node when the master clock equals 200, 300, 400, and 500 respectively. These messages are respectively received at slave node 22B when node 22B's clock equals 217, 314, 409, and 508. Slave node 22B calculates delays of 17, 14, 9, and 8 respectively for these four synchronization messages. Similarly, the messages are respectively received at slave node 22C when node 22C's clock equals 220, 315, 409, and 510. Slave node 22A calculates delays of 20, 15, 9, and 10 respectively for the four synchronization messages.

At the end of the time interval T, each slave node 22A–22B may select one of the synchronization messages 1–5 that experienced the optimal delay. In one embodiment, slave node 22A may select synchronization message 1 as the synchronization message having the optimal delay in the time interval in which messages 1–5 are received. Slave node 22B may select synchronization message 5 as the message having the optimal delay.

In some embodiments, a slave node may be configured to disregard messages for which a negative delay is calculated unless the slave node's clock is running faster than the master node's clock (e.g., as determined during earlier synchronization intervals). Thus, a slave node may be configured to not select a message for which negative delay is calculated as the message having the optimal delay for a given time interval unless the slave node has also detected that the slave node's clock is running faster than the master node's clock. Similarly, a slave node may be configured to not select a message having the absolute least delay (e.g., the most negative delay) if that synchronization message's delay is a statistical anomaly.

Figure 4:
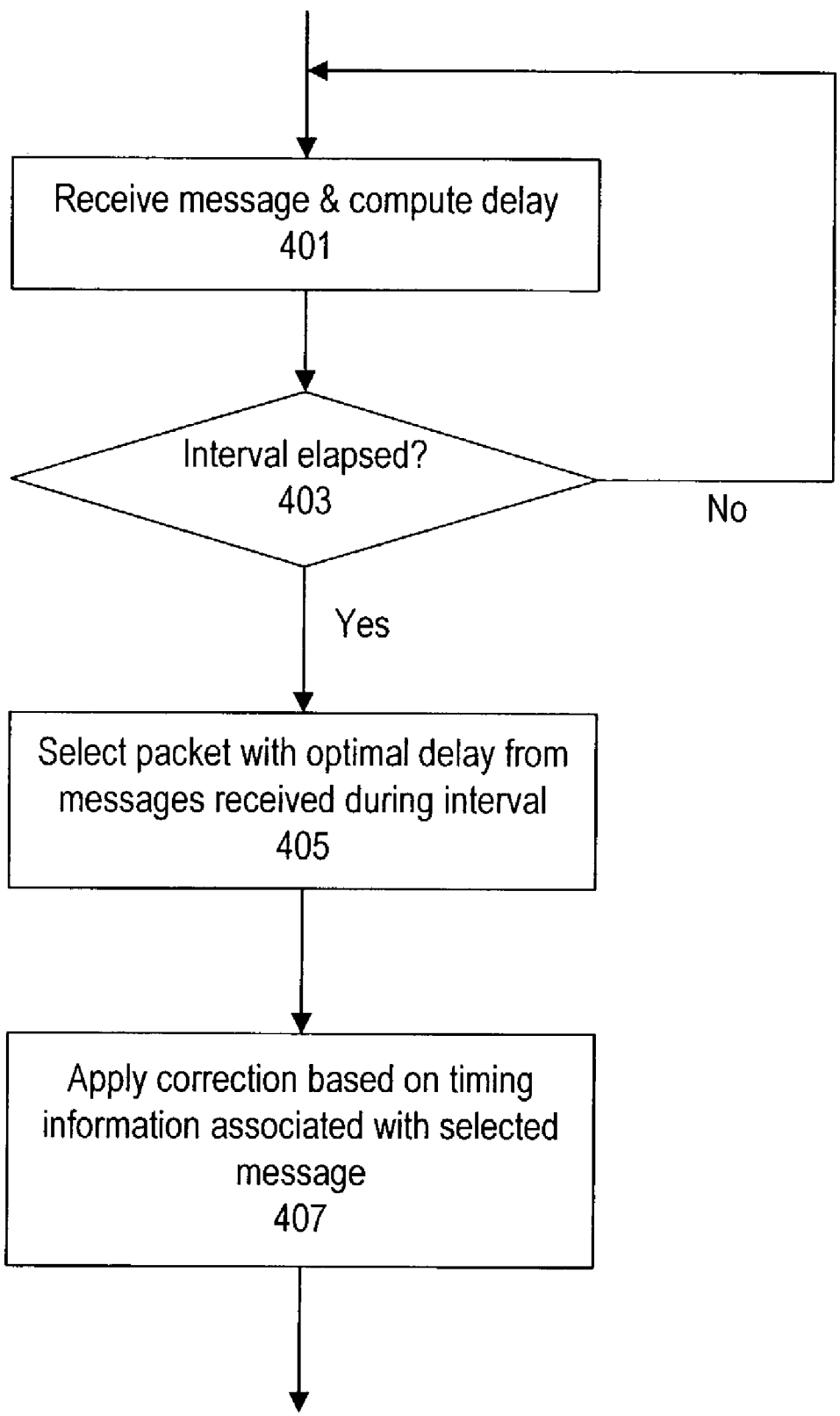
FIG. 4 is a flowchart representing one embodiment of a method of synchronizing a slave node's local clock to a master node's clock.

FIG. 4 is a flowchart representing one embodiment of a method of synchronizing a slave node's local clock to a master node's clock. At 401, the slave node receives a message from the master node and computes the delay experienced by that message. The slave node may determine the delay by computing the difference between the time at which the message was sent, according to the master node's clock, and the time at which the message was received, according to the slave node's clock. The time at which the message was sent may be determined either from a timestamp included in the message or from the slave node's knowledge about when the master node sends synchronization messages (e.g., the slave node may be programmed to know that the master node sends synchronization messages every 100 ticks of the master node's clock, beginning when the master node's clock has a particular value).

The message received at 401 is received during one of several synchronization time intervals. The slave node may receive several synchronization messages from the master node during each time interval.

As indicated at 403–405, if the synchronization time interval in which the message was received is over, the slave node may select the message received during that interval that experienced the optimal delay, as calculated at 401. In some embodiments, identifying the synchronization message having the optimal delay for a given interval may involve performing statistical analysis on the delays of the synchronization messages received during that interval. Note that in some embodiments, more than one message may be selected at 405.

Once the message that experience the optimal delay is selected at 405, the slave node may calculate a correction to apply to the slave clock based on timing information associated with the selected message. The slave node may apply the calculated correction to the slave clock, as indicated at 407.

Figure 5:
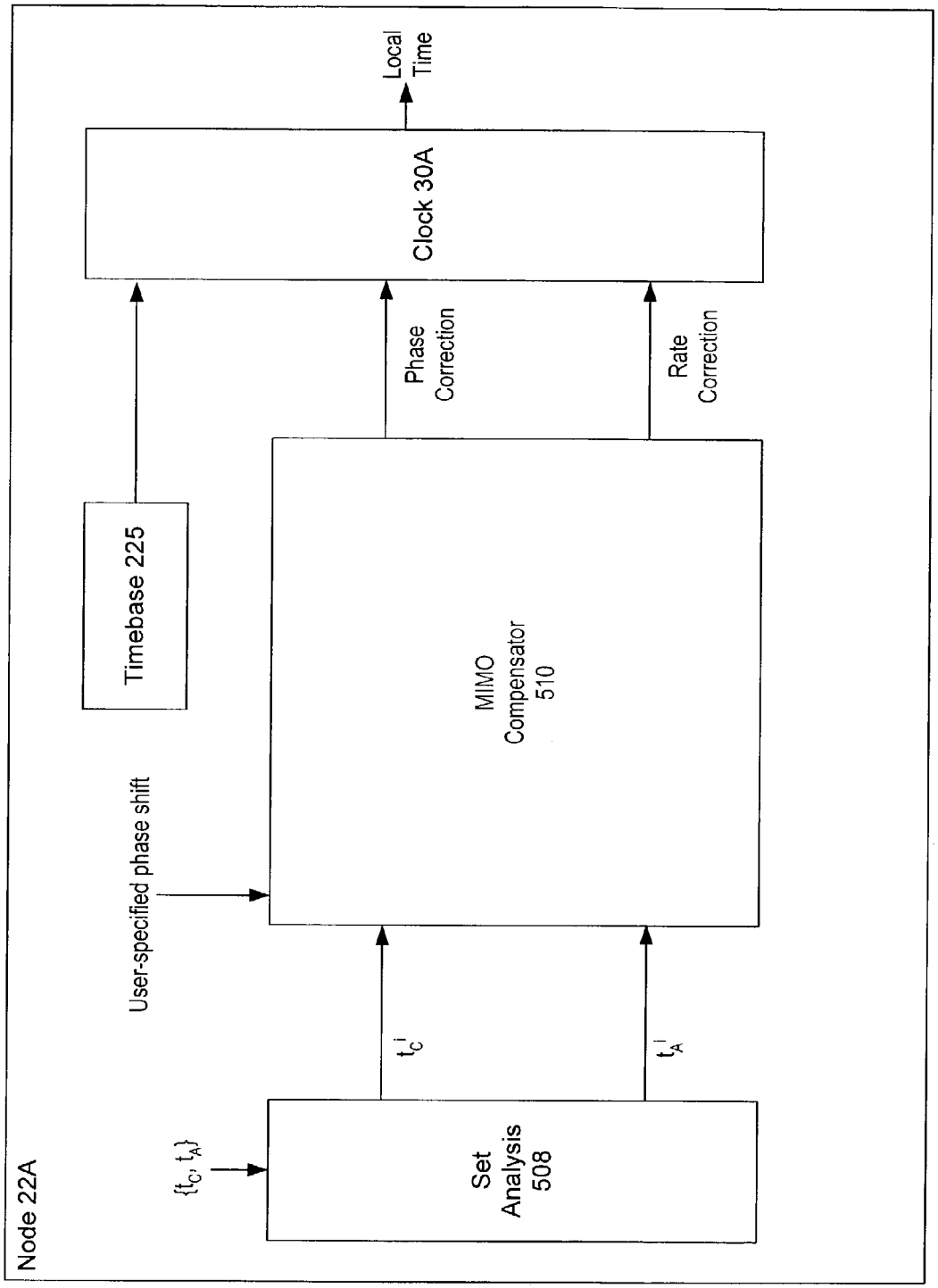
FIG. 5 is a block diagram of a slave node, according to one embodiment.

Each slave node may implement one or more control loops in order to apply clock corrections determined according to the synchronization protocol. FIG. 5 illustrates one embodiment of a slave node 22A that includes a slave clock 30A, a timebase 225, a set analysis unit 508, and a MIMO (Multiple Input Multiple Output) compensator 510. The set analysis unit 508, MIMO compensator 510 and slave clock 30A may be implemented in hardware, software, or a combination of both. The MIMO compensator 510 may include one or more a PID (Proportional Integral Derivative) control loop in some embodiments.

The slave clock 30A is derived from a local timebase 225 and is adjusted in response to a rate correction and/or phase correction generated by the compensator 510. The slave clock 30A generates the local time for slave node 22A. Slave node 22A may use the local time to timestamp synchronization messages sent and received by slave node 22A and to trigger performance of various functions by slave node 22A. In one embodiment, the slave clock 30A may be a logical clock that generates the local time by combining the rate correction with an uncorrected local time value derived from the local time base.

As shown in FIG. 5, the slave node 22A may input timing information associated with one or more synchronization messages to set analysis unit 508. For example, the slave node 22A may input timing information associated with a set of synchronization messages (e.g., master and slave node timestamps $\{t_C, t_A\}$ generated for each of the set of synchronization messages) received during a particular time interval to set analysis unit 508. The set analysis unit 508 may select the synchronization message having the optimal delay from the set of synchronization messages using this timing information. The set analysis unit 508 may output timing information (e.g., timestamps $t_C^i$ and $t_A^i$) associated with the selected synchronization message to compensator 510.

The compensator 510 receives the timing information associated with the selected synchronization message from the set analysis unit 508 and operates to generate a rate correction and/or phase correction in response to this input timing information. In some embodiments, the compensator 510 may also receive an input indicative of a user-specified phase shift and generate the rate and/or phase corrections dependent on that input.

In one embodiment, the compensator 510 may generate the rate correction by calculating the difference between the time $t_A^i$ at which the slave node 22A received the selected synchronization message i and the time $t_A^{i-1}$ at which the slave node 22A received an earlier-sent synchronization message i–1. The slave node 22A may also calculate the difference between the time $t_C^i$ at which the master node 22C sent the synchronization message i and the time $t_C^{i-1}$ at which the master node 22C sent the earlier-sent synchronization message i–1. The difference between the two calculated values may be input to a control loop that operates to equalize the two calculated values. Both messages i and i–1 may have been messages selected as having the optimal delay within a respective time period. Message i may have been selected in the time interval immediately preceding the time interval in which message i+1 was selected. Note that in some embodiments, timing information associated with more than two synchronization messages or timing information representative of a cumulative rate difference may be used to calculate the rate correction.

In addition to operating based on the difference between the two most recently selected synchronization messages, the compensator 510 may also generate the rate correction dependent on a value indicative of an cumulative rate difference between the master clock and slave clock. This cumulative rate difference may be generated internally within the compensator 510 and updated each time new timing information is received from set analysis unit 508.

Figure 5A:
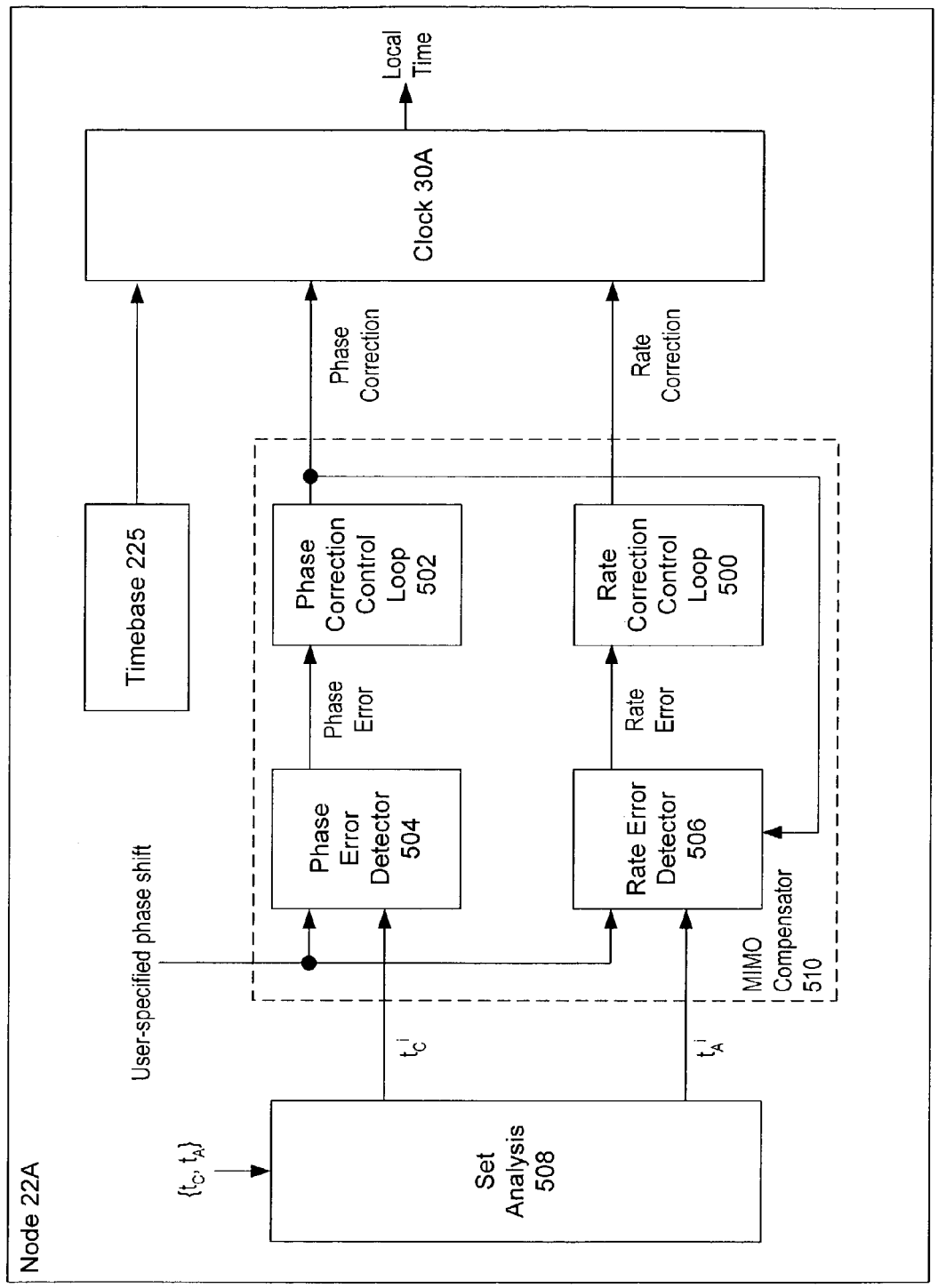
FIG. 5A is a block diagram of a slave node, according to another embodiment.

FIG. 5A illustrates another embodiment of a slave node 22A. In this embodiment, the compensator 510 includes a phase error detector 504, a phase correction control loop 502, a rate error detector 506, and a rate correction control loop 500. The phase correction control loop 502 and rate correction control loop 500 may each include a PID control loop.

The phase error detector 504 may receive an input indicative of a user-specified phase shift, if any, and timing information indicative of the time $t_C^i$ at which the master node 22C sent the selected synchronization message. The phase error detector 504 may also receive other inputs in some embodiments. For example, in one embodiment, the phase correction control loop 502 may receive an input indicative of the slave time difference between the slave clock time at which the slave clock received synchronization message i and the slave clock time at which the slave clock received synchronization message i–1. Another difference, generated by subtracting a value representative of the network delay from the slave time at which synchronization message i is received, may be subtracted from the slave time difference.

The phase error detector 504 may operate to generate a value indicative of a phase error for slave clock 30A. This phase error may be input to phase correction control loop 502, which may in turn generate a phase correction value. The slave clock 30A may adjust its phase in response to the phase correction value.

The rate error detector 506 may receive an input indicative of a user-specified phase shift, if any, and an input indicative of the slave clock time $t_A^i$ at which the selected synchronization message is received by slave node 22A. The rate error detector 506 may also receive an input indicative of the phase correction generated by the phase correction control loop 502. The rate error detector 506 may use this information to generate a value indicative of a rate error. The rate error control loop 500 may receive this rate error value and responsively generate a rate correction to apply to slave clock 30A.

In one embodiment, the slave node 22A may be configured to implement the phase correction control loop 502 so that any adjustment to the phase of the slave clock 30A is spread out over several rate correction cycles in which the rate of the slave clock 30A is being adjusted via rate correction control loop 500.

Exemplary Nodes

Figure 6:
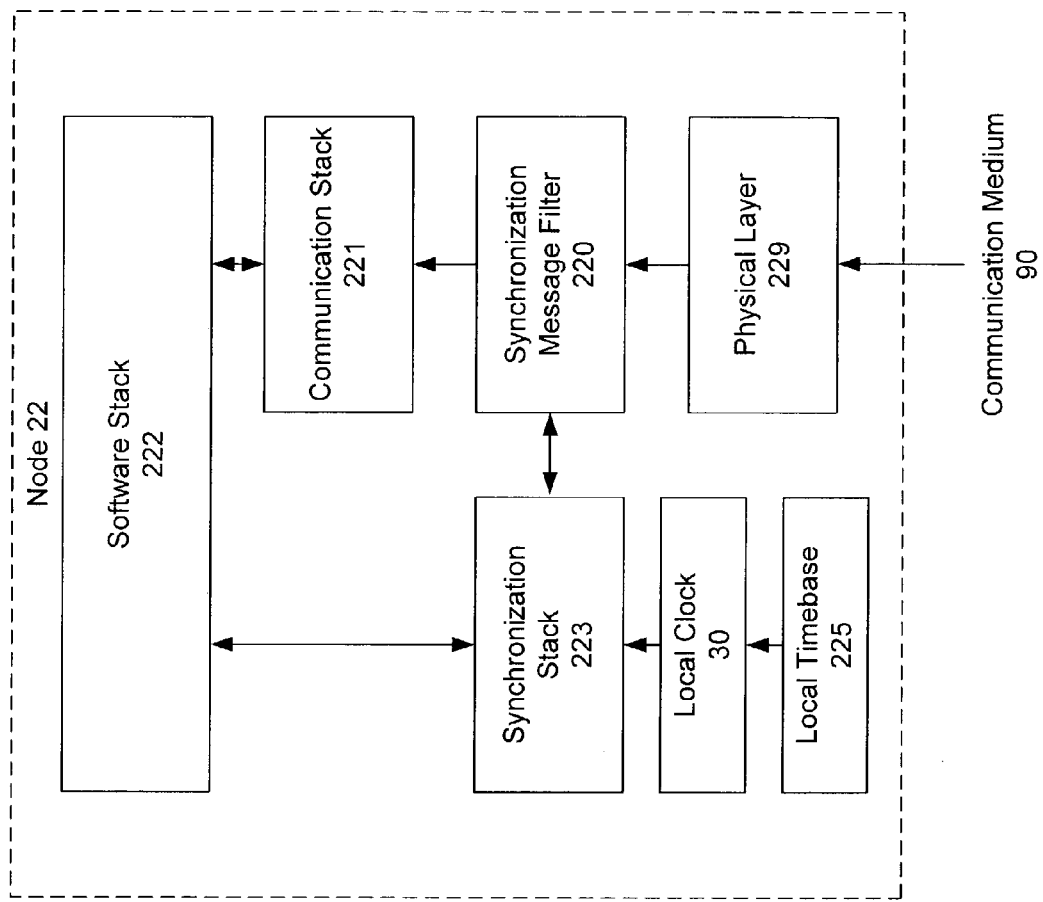
FIG. 6 shows components of a synchronization subsystem that may be implemented within a node of a distributed control and monitoring system, according to one embodiment.

FIG. 6 shows components of a synchronization subsystem implemented within a node 22 of a distributed C&M system 20, according to one embodiment. The node 22 includes a software stack 222, a communication stack 221, a synchronization message filter. 220, a physical layer interface 229, a synchronization stack 223, a local clock 30, and a local timebase 225. The synchronization message filter 220 intercepts all messages sent from physical layer 229 to communication stack 221 and software (SW) stack 222. If the synchronization message filter 220 detects a synchronization message 300, synchronization message filter 220 notifies the synchronization stack 223 and the synchronization stack 223, in turn, reads a local time from the local clock 30. The local clock 30 is driven by a local timebase 225. The synchronization stack 223 uses the local time, data from the most recently received synchronization message, and, in some embodiments, data from one or more previously received synchronization messages, to compensate for the rate and offset differences between the common time and the local clock 30. In some embodiments, the synchronization stack 223 may include the set analysis unit 508 and compensator 510 shown in FIGS. 5 and 5A for use in generating the compensation values. The compensation values may be used to synchronize local clock 30 with the master clock. The synchronization stack may also generate compensation values to convert the adjusted local clock 30 time to the common time upon a request from the SW stack 222. This embodiment may be used to implement case a) discussed above.

Figure 7:
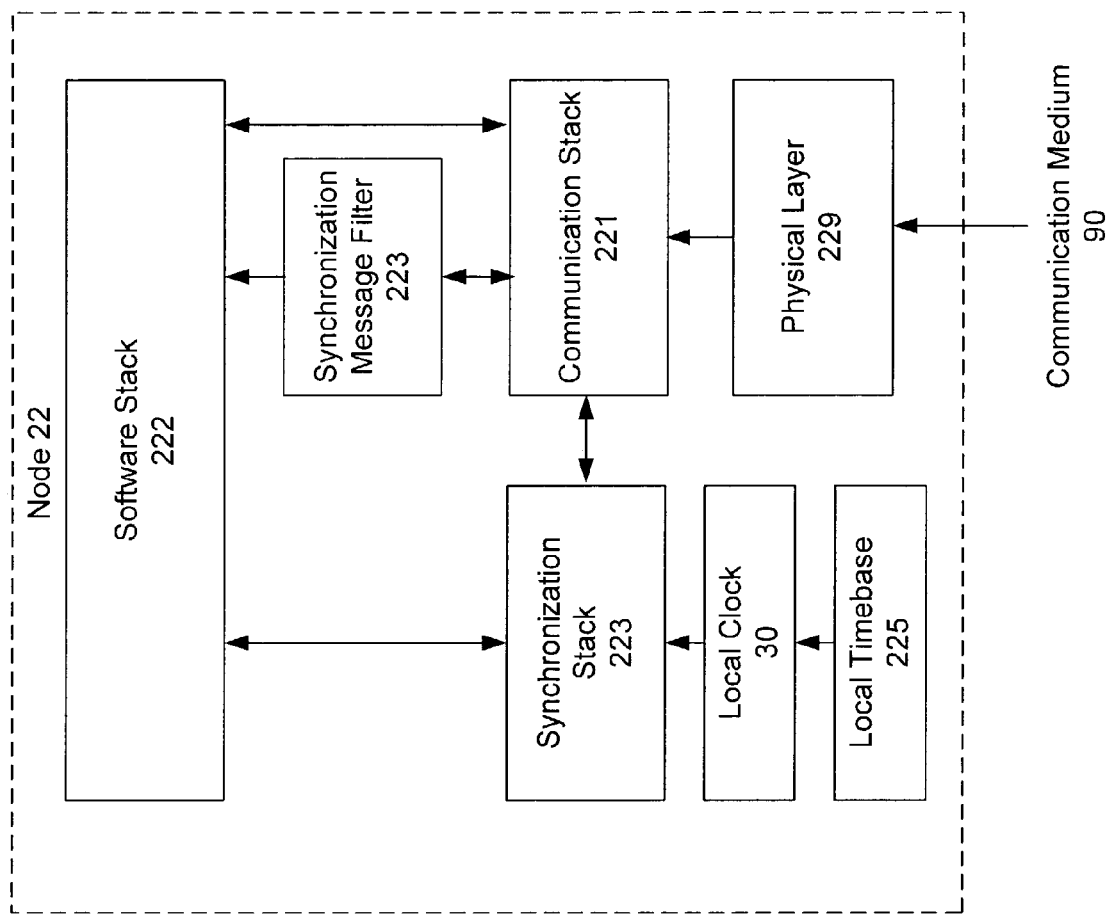
FIG. 7 illustrates a synchronization subsystem that may be included in a node, according to another embodiment.

Another embodiment of a synchronization subsystem that may be included in a node 22 is shown in FIG. 7. In this embodiment, synchronization messages 300 are intercepted after all messages are handled by the communication stack 221. This approach may be used in embodiments where the synchronization message filter 223 does not have access to the physical layer 229.

Figure 8:
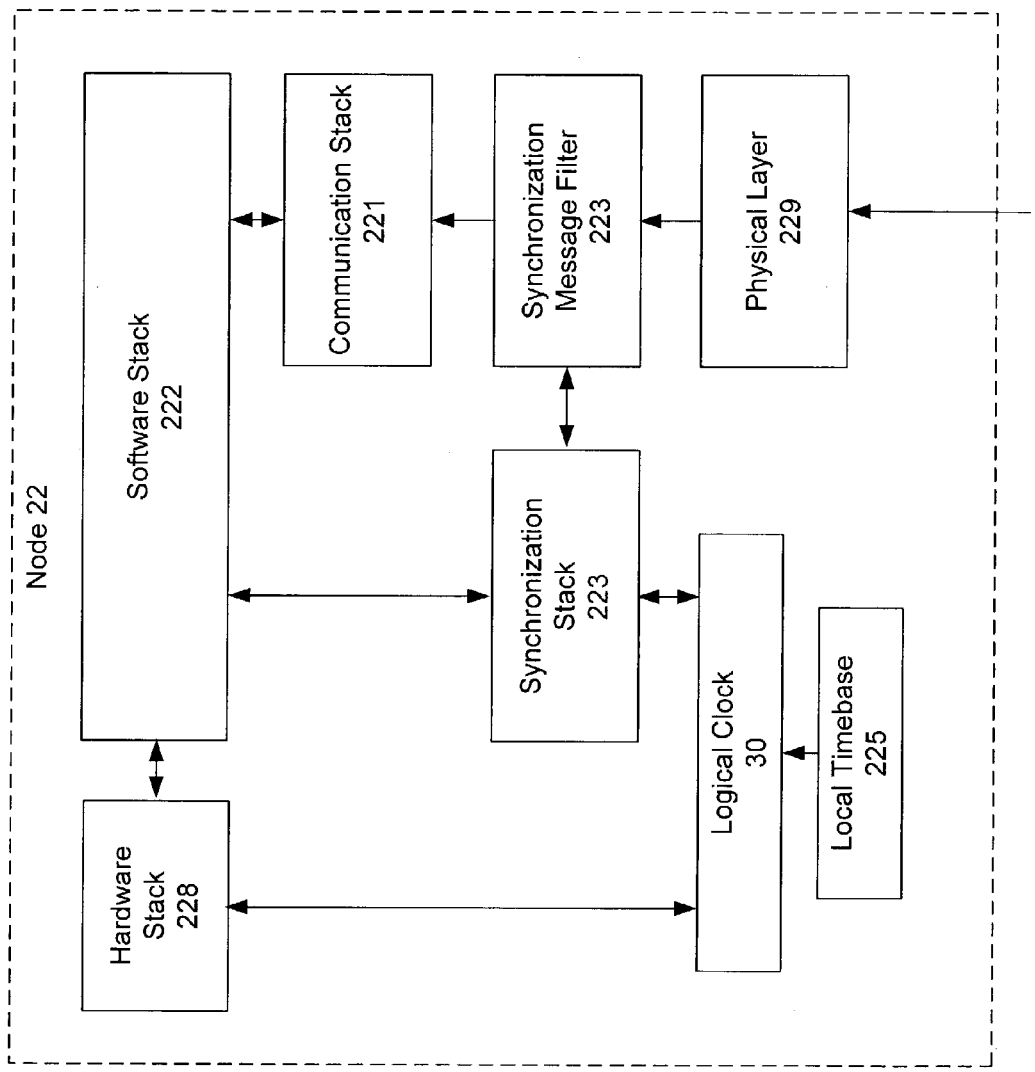
FIG. 8 illustrates a synchronization subsystem that may be included in a node, according to yet another embodiment.
Figure 9:
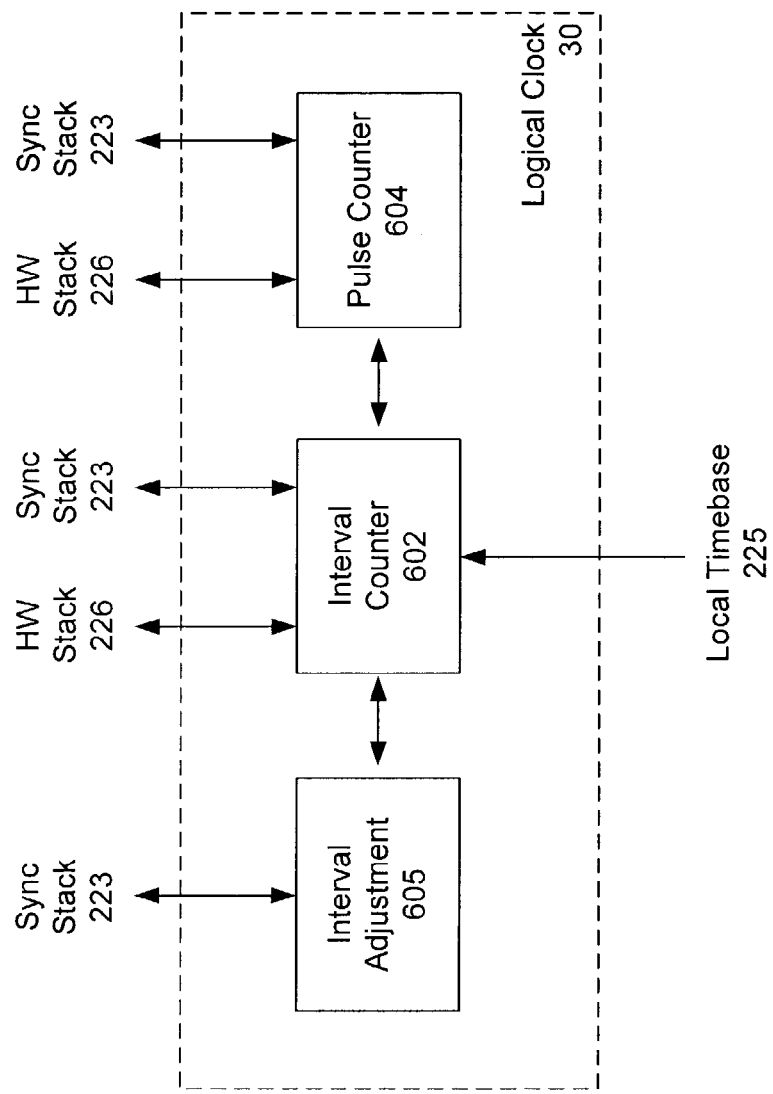
FIG. 9 is a block diagram of a logical clock, according to one embodiment.

FIG. 8 illustrates yet another embodiment of a synchronization subsystem. In this embodiment, local clock 30 is a logical clock. Here, a synchronization message filter 220 intercepts all messages sent from a physical layer 229 to a communication stack 221 and a SW stack 222. If the synchronization message filter 220 detects a synchronization message 300, synchronization message filter 220 notifies the synchronization stack 223. In response, the synchronization stack 223 reads a logical time from the logical clock 30. The logical clock 30 is driven by a local timebase 225 and may, in some embodiments, include an interval counter 602, pulse counter 604, and interval adjustment unit 605, as shown in FIG. 9. The interval counter 602 produces pulse every N cycles of the timebase 225 (N>1). Pulses produces by interval counter 602 are recorded by the pulse counter 604. The time between two successive pulses at the output of the interval timer 602 is denoted as a cycle of the interval counter. The values stored in the interval and pulse counters may be used to calculate the logical time in the units of local timebase 225 as follows: (1+# of counts recorded by the pulse counter 604)–(# of counts of interval counter 602 left before the next pulse on its output).

The synchronization stack 223 may use the logical time, data from the most recently received synchronization message 300, and, in some embodiments, data from one or more previously received synchronization messages, to calculate a rate difference between the master clock and logical clock 30 (e.g., using a rate correction loop 500). The rate difference may then be converted into a number of cycles of the timebase 225 to be added to one or more cycles of the interval counter 602 so that the pulse train on interval counter 602's output is sped-up or slowed down until, on average, the master clock and logical clock 30 have the same rates (to within specified precision).

Once the rate of the logical clock has been compensated, the synchronization stack 223 may adjust logical clock 30 to look as if the pulse train has started at a given common time (e.g., using a phase correction loop 502). Synchronization stack 223 may perform such an adjustment once, periodically, and/or upon a request from SW stack 222. If applied on all nodes, such an adjustment may guarantee that pulses coming out of the logical clocks 30 will beat in sync and occur at the same time, which solves cases b), c), and d) discussed above. In some embodiments, the interval adjustment logic 605 may be used to automatically reload interval counter 602 with new values without intervention from SW thus reducing presence of SW jitters and strain on the processor. The HW stack 228 may use synchronized pulse trains to perform synchronous data acquisition and/or generation. In addition, the HW stack may use latched pairs of values (interval counter 602, pulse counter 604) to timestamp data and/or events. The pairs of values may be converted into an actual common or global time later.

As with the synchronization subsystem shown in FIG. 6, an alternative embodiment may place the synchronization message filter 220 between the communication stack 220 and SW stack 222.

Figure 10:
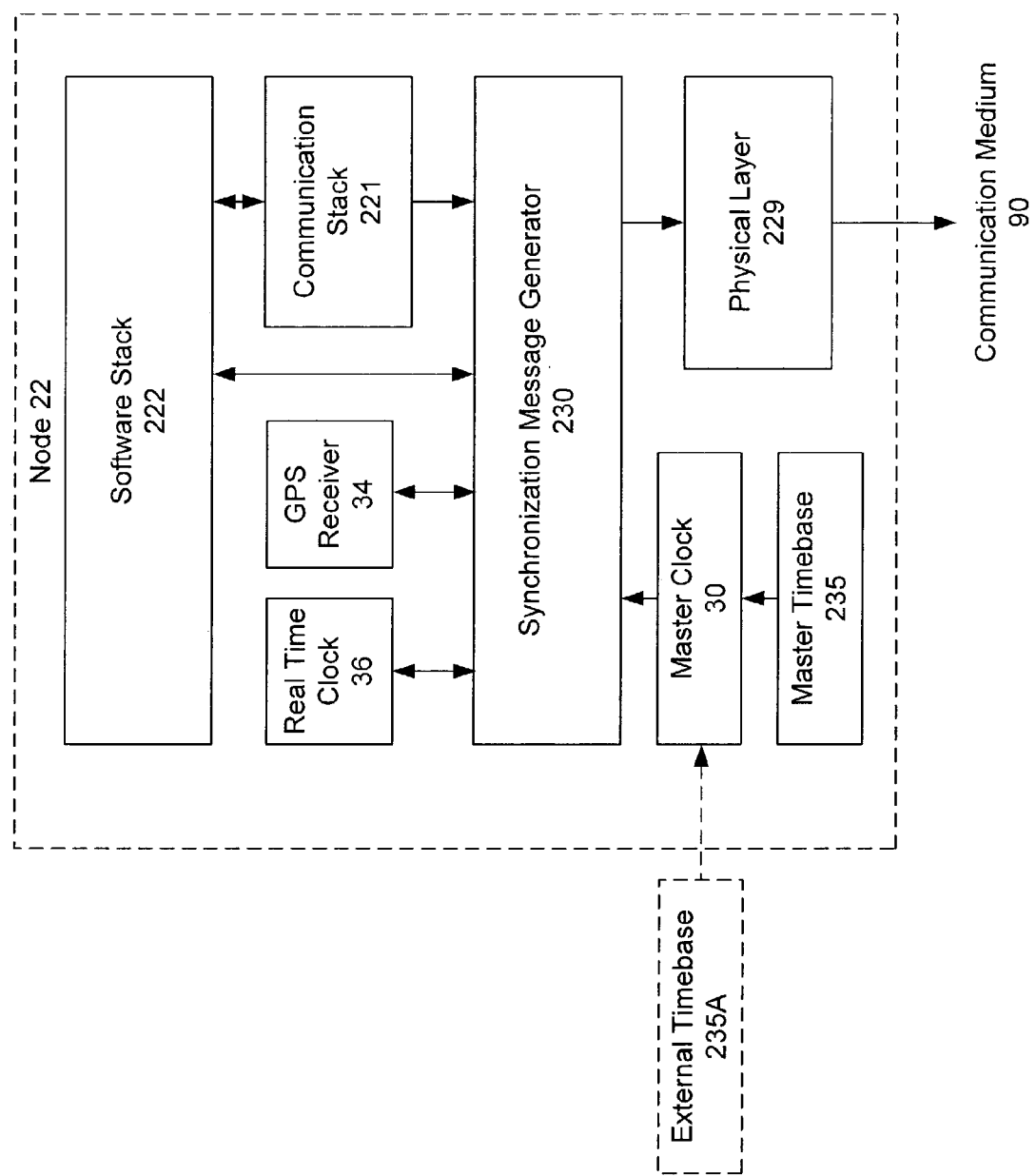
FIG. 10 illustrates components of a synchronization subsystem that may be implemented in a master node, according to one embodiment.

FIG. 10 illustrates components of a synchronization subsystem that may be implemented in a master node 22 in a distributed C&M system, according to one embodiment. A synchronization message generator 230 reads a timestamp 330 from the master clock 30 driven by master timebase 235. Note that in some embodiments, an optional external source may generate an external master timebase 235A (shown in dashed lines) may be generated by an external source, effectively turning slave nodes may into timebase replicators. The master node 22C builds the synchronization message 33 of FIG. 2 and sends it to the physical layer 229 to be broadcast to the rest of the nodes in the distributed C&M system. Depending on the implementation, the generator may adjust the timestamp based on global time provided by the real-time clock 237 or GPS receiver 238 or send the required transformation information 231 of FIG. 2 via the synchronization message. The synchronization message may be sent in regular intervals or upon a request from the SW stack 232. The generator is positioned between a communication stack 231 and the physical layer 229 so it may prevent any other outgoing traffic from delaying the synchronization message. The synchronization message generator may also generate a timestamp not to be sent over the wire but sent up to the SW stack.

Figure 11:
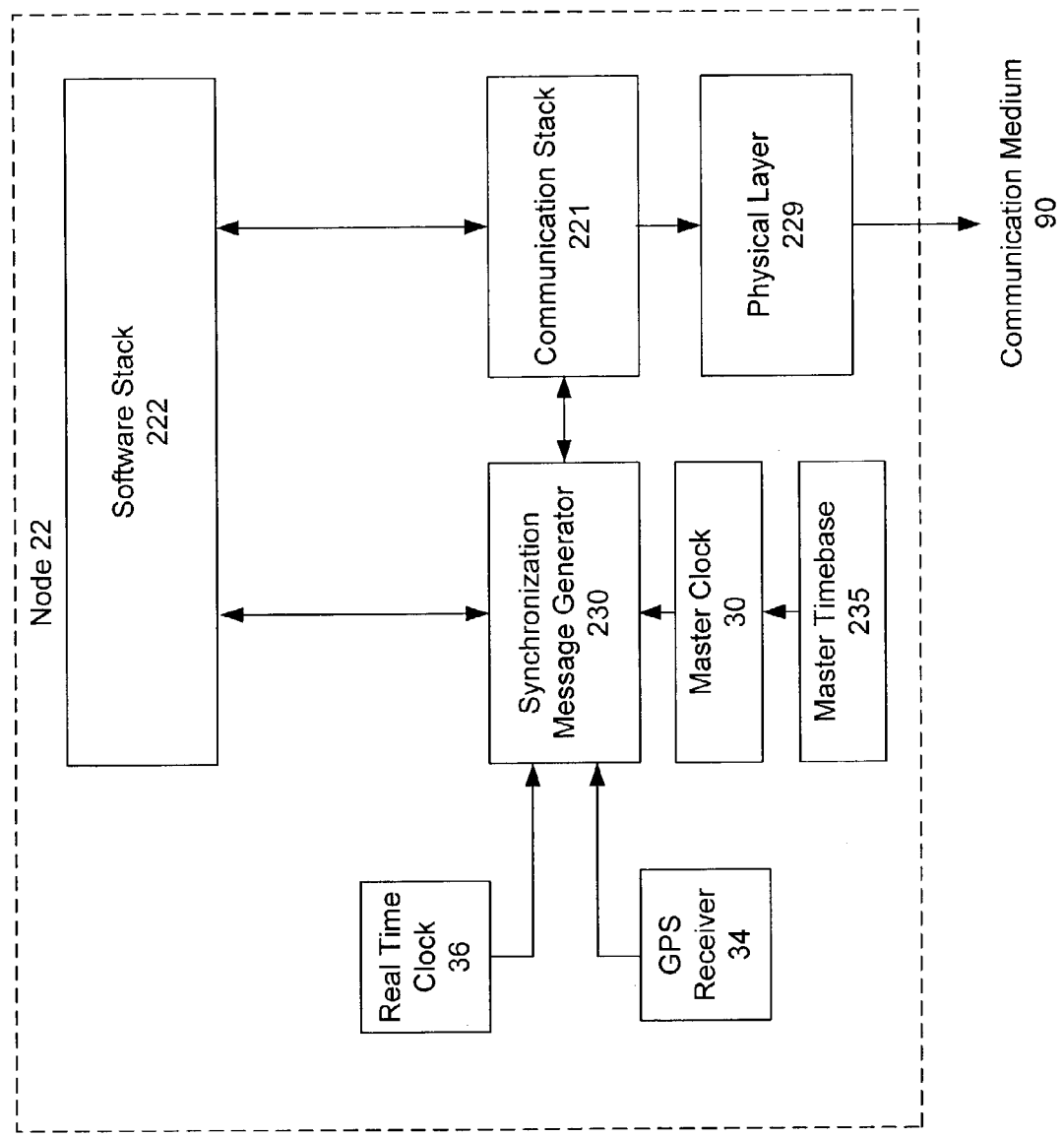
FIG. 11 shows a synchronization subsystem that may be implemented in a master node, according to another embodiment.

An alternative embodiment of the time-server synchronization subsystem is shown in FIG. 11. In this embodiment, the synchronization messages generator 230 is positioned above the communication stack 231. This approach may be used if the synchronization subsystem does not have access to the physical layer 229.

Figure 12:
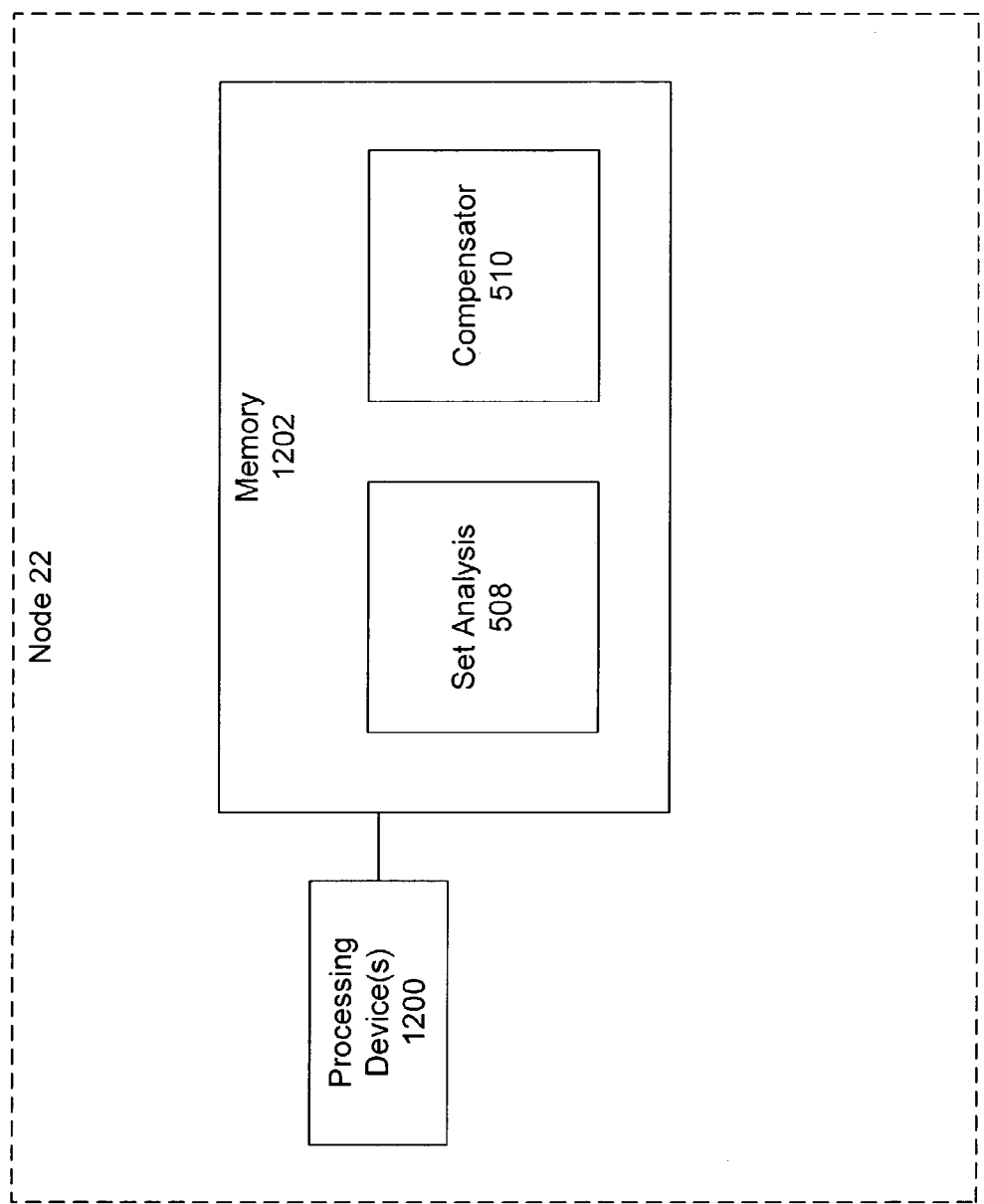
FIG. 12 is a block diagram of yet another embodiment of a node.

FIG. 12 illustrates one embodiment of a node 22 that includes one or more processing devices 1200 (e.g., CPUs or other ASICs configured to execute program instructions) coupled to a memory 1202. The memory 1202 (or another computer accessible medium such as a disk drive, CD-ROM, etc.) may store program instructions executable by the processing devices 1200 to implement the compensator 510 and set analysis 508 functionality of FIGS. 5 and 5A as part of one of the synchronization subsystems of FIGS. 6–11.

Various embodiments may further include receiving, sending or storing instructions and/or data implemented in accordance with the foregoing description upon a computer accessible medium. Generally speaking, a computer accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Synchronization Algorithm

Various synchronization algorithms may be used to synchronize nodes of a distributed C&M system. In one embodiment, the following algorithm may be used. This algorithm is described in terms of a time-server (master) that generates a synchronization message 33 of FIG. 2 and a receiver (slave or node "k") that uses the message 33 to synchronize its clock to a common time.

The following notation is used to describe the synchronization algorithm that each slave node may use to synchronize its local clock to the master clock:

$f_k$ Timebase 225 frequency on node k;

$f_{TS}$ Timebase frequency 235 of the time-server synchronization subsystem;

$t_k'$ Value of the local clock 30 on node k; $t_k'=0$ corresponds to the moment when the local clock 30 starts counting cycles of the timebase 225; the local clock 30 increments in units of the timebase 225;

$t_k$ Value of the local clock 30 adjusted for the difference in the rate with respect to the master clock 236 on node k; $t_k=0$ corresponds to the moment when the local clock 30 starts counting cycles of the timebase 225; the local clock 30 increments in units of the timebase 225; the local clock is adjusted in units of timebase 225 multiplied by the rate correction factor; both HW or derived logical clocks 30 may "stall" to prevent time flow from becoming negative;

$t_{TS}$ Value of the master clock 236;

$t0_k$ Value of the master clock 236 when the local clock 30 on node k starts ticking;

$t0_{TS}$ Absolute time t when the master clock 236 starts ticking;

t Absolute time base of a master's GPS receiver block 238 or master's real-time clock 237; The $t_{TS}$ and $t0_{TS}$ are introduced to avoid confusion with $t_k$ and $t0_k$ when the master node k=M contains blocks specific to both time-server and receiver synchronization subsystems.

Let $t_{TS}^i$ denote a value of $t_{TS}$ when the master node initiates sending of the $i^{th}$ synchronization message, $t_k^i$ a value of $t_k$ when the $i^{th}$ synchronization message has been detected in the synchronization stack 223 on a slave node k, $\Delta t_{N,TS,k}^i$ a delay of the $i^{th}$ synchronization message from the moment the synchronization message generator 230 on the master read the value of the master clock 236 to the moment the synchronization stack 223 on the node k read value of the local clock (N stands for network), $\Delta t_{TS,k}^i$ a difference in master and slave clock values due to a difference in their rates, and $\Delta t_{N,TS,k,min}$ the minimum value of $\Delta t_{N,TS,k}^i$ for any message i. All times are expressed in same units, for example, in μs as defined by the time-server.

A synchronization message delay $\Delta t_{N,TS,k}$ is a sum of the following:

1) Delay in the protocol layer on the master. For example, a process that builds and broadcasts the synchronization message may be delayed by other processes running on the master node or by another message that is in a process of being sent by the communication stack on the master node;

2) Communication medium access grant delay. This delay may occur in the physical layer of the sending node (e.g., if another message is currently being transmitted over the communication medium);

3) Transmission delay. Transmission delay is the time required to send a synchronization message over the communication medium 90. This delay may depend on the communication medium's transmission speed and/or current traffic on the communication medium (e.g., load on switches and routers that may be in the message's path); and/or 4) Delay in the protocol layer on the receiver. For example, a process that receives and processes the synchronization message may be delayed by other processes running on the node.

Using the notation and assumptions introduced above, the following equation holds for each synchronization message i received by node k:

$$t_k^i = t_{TS}^i + \Delta t_{N,TS,k}^i + \Delta t_{TS,k}^i - t0_k \qquad \text{Eq. 2}$$

where $\Delta t_{TS,k}^i - \Delta t_{TS,k}^j$, i>j, is positive if slave clock runs faster and negative if it runs slower than the master clock. Note that the "slope" and not the sign of $\Delta t_{TS,k}^i$ carries the information about the rate difference between the two clocks, as will be explained in more detail below.

Assuming that the first message received at node k was the $I^{th}$ message, a new quantity $\Delta t_k^i$ can be defined as:

$$\Delta t_k^i = t_k^i - t_k^I = \Delta t_{TS}^i + \delta t_{N,TS,k}^i + \delta t_{TS,k}^i \qquad \text{Eq. 3}$$

where $$\Delta t_{TS}^i = t_{TS}^i - t_{TS}^I$$

$$\delta t_{N,TS,k}^i = \Delta t_{N,TS,k}^i - \Delta t_{N,TS,k}^I$$

$$\delta t_{TS,k}^i = \Delta t_{TS,k}^i - \Delta t_{TS,k}^I \qquad \text{Eq. 4}$$

Note that $\Delta t_k^i$ does not depend on $t0_k$. Since $\Delta t_k^i$ and $\Delta t_{TS}^i$ may be calculated for each synchronization message, a new quantity D that is known for every synchronization message received by node k may be defined:

$$D^i = \Delta t_k^i - \Delta t_{TS}^i = \Delta t_{N,TS,k}^i - \Delta t_{N,TS,k}^I + \Delta t_{TS,k}^i - \Delta t_{TS,k}^I \qquad \text{Eq. 5 or}$$

$$D^i \delta = t_{N,TS,k}^i + \delta t_{TS,k}^i \qquad \text{Eq. 6}$$

Equations Eq. 5 and Eq. 6 imply that two independent processes govern changes in D: one process is related to the generation and transmission of synchronization messages whereas the other process is related to the clock rates. The first process is fast and random, i.e., the value of $\delta t_{N,TS,k}$ may change significantly and randomly from the $i^{th}$ to $i+1^{th}$ message. The second process is, in general, slow and predictable in the short term, especially in embodiments using crystal oscillators, which tend to change frequency very slowly and to experience changes on the order of a few ppm, as timebases. A rapid temperature change in the environment immediately next to a crystal oscillator is an example of a situation in which assumptions about the second process may break down.

Ignoring the network term by assuming that all messages are delayed by the same amount, i.e., $\delta t_{N,TS,k}^i = 0$ for each i, it can be shown that two clock rates have been equalized when:

$$D = \text{const.} \qquad \text{Eq. 7}$$

Since the rate term $\delta t_{TS,k}$ of equation Eq. 6 is a slowly varying quantity, D may be stabilized via a feedback loop. In one particular embodiment, a control loop may be used to force $D^{i+1} - D^i$ to its set point of 0 by modifying value of slave clock. For a constant delay, requirement of Eq. 7 may be expressed as $$D^{i+1} - D^i = \Delta t_k^{i+1} - \Delta t_{TS}^{i+1} = \Delta t_{TS,k}^i \Delta t_{TS,k}^I = \text{const.} \qquad \text{Eq. 8}$$

Note that each control loop has its own time constant α, i.e., under steady input it takes control loop certain amount of time to force system under control to the set point. Consequently, the algorithm will be able to compensate for any changes in the master clock rate as long as the rate of change of the master clock is much smaller than α.

The above example assumes that transmission delays are constant. However, in most embodiments, transmission delays may vary from message to message. The first conclusion is that the value of the feedback loop will now also depend on the message delay since the two terms in equation Eq. 6 cannot be separated. This is a problem because, in general, and especially on a busy network, changes in D will be completely dominated by the network component $\delta t_{N,TS,k}$. For example, the master clock rate change of 1 ppm will cause 1 μs drift per second, whereas a single synchronization message may be delayed over 100 ms.

To solve the above problem, the jitter in the $\delta t_{N,TS,k}$ component of Eq. 6 needs to be reduced. Let's take two time intervals $T_1 = [t_1, t_1+T]$ and $T_2 = [t_2, t_2+T]$ where T is the length of the two intervals, $t_2 = t_1 + r^*T$, and r>0. Once the rates have been synchronized, the network term becomes a major contributor to the jitter in equation Eq. 6 (if this is not the case, Eq. 6 should be used as is in the feedback loop since either the two terms are of the same magnitude, in which case there is nothing we can do, or the clock rate term dominates, in which case the algorithm will be able to compensate for the rate changes down to the network jitter levels). Based on this assumption, one can conclude that the messages with the minimum value of D from each set of the messages received in two intervals have also been delayed the least (or close to being delayed the least since there is still a smaller jitter from the second term of equation Eq. 6). If we further assume that the two messages with minimum values of D, denoted $D^1$ and $D^2$, have been delayed less than $\epsilon + \Delta t_{N,TS,k,min}$, it follows from equation Eq. 5 that the jitter in $D^1$ and $D^2$ due to the network term will be less or equal to $\epsilon$. Consequently, if conditions are met that for any interval $T^i$ of length T, at least one message has been delayed within $\epsilon$ from the minimum delay $\Delta t_{N,TS,k,min}$, then $\epsilon$ becomes a lower bound to the overall jitter in the clock synchronization algorithm due to the synchronization message delays.

Now, the consequences due to presence of the time constant $\alpha$ will be examined. Assume that the two clocks run at the same rate and that a pulse is generated on both master and slave for every hundred cycles of the respective clocks. On the master, the pulse train may be generated through a simple decimation of the master timebase, whereas on the slave, the pulse train may be generated by the interval counter 602 located in the local clock 30. Assume that the phases of the two pulse trains are aligned so that their pulses occur at exactly the same moment (within the smaller of the two timebase resolutions). If now the rate of the master timebase abruptly goes up, for example, due to a change in temperature, the time interval between pulses in its pulse train will decrease. In parallel, the time between pulses in the slave pulse train will reduce more slowly because the slave cannot react instantaneously due to a presence of $\alpha$. Consequently, by the time the clock rates are equalized, i.e., the time distance between two subsequent pulses in the two trains become the same, a phase shift may be introduced. Note that once the temperature on the master goes back to its previous level, the reverse process will take place and the phase difference will go back to 0 unless the two processes walk different path in the state space, which may result in an accumulation of a different phase shift.

The above analysis shows that even slight temperature changes, such as changes in the office temperature between night and day, may cause phase shifts if the temperature coefficients of the master and slave clock crystals are different. The shift may occur despite the two coefficients being the same if the temperature change in the environments causes different temperature changes at the crystal package surfaces.

To attempt to explain the presence of the phase shift in terms of Eq. 1, set $\Delta t_{N,TS,k}$ to a constant value. Also assume a) the nodes are fully synchronized at an $i^{th}$ message; b) sometime between the $i^{th}$ and $i+1^{th}$ message, the rate of the master clock increases; c) the clocks resynchronize at the $i+n^{th} = j^{th}$ message; and d) $\Delta t_{TS,k}$ should be 0 once the clock rates have become equal. The following equations should then hold for the $i^{th}$ and $j^{th}$ synchronization messages:

$$t_k^i = t_{TS}^i + \Delta t_{N,TS,k} - t0_k$$

$$t_k^j = t_{TS}^j + \Delta t_{N,TS,k} - t0_k \qquad \text{Eq. 9}$$

The above discussion about a presence of a delay in the slave clock adjustment process implies:

$$t_{TS}^j - t_{TS}^i > t_k^j - t_k^i \qquad \text{Eq. 10}$$

which in turn shows that one of the equations Eq. 9 is invalid. This is because terms $\Delta t_{TS,k}^i$ and $\Delta t_{TS,k}^j$ contain terms that could be perceived as changes in $t0_k$ due to rate changes which do not go to 0 when the two rates are equalized. Only the rate of change of $\Delta t_{TS,k}$ from one message to the other goes to 0. For example, assume a difference is recorded between $t_k^i$ and $t_{TS}^i$. To preserve the phase of the acquisition pulses, we have to make sure that $$t_k^l - t_{TS}^l = t_k^m - t_{TS}^M \qquad \text{Eq. 11}$$

holds for any two messages l and m. Modifying the slave clock by:

$$\beta^j * [t_k^j - t_{TS}^j - (t_k^i - t_{TS}^i)] \qquad \text{Eq. 12}$$

where $\beta^j > 0$, for message j, achieves that. Modifying value of $t_k^j$, though, may cause trouble because changing $t_k^j$ also affects $\Delta t_k^j$, which in turn affects D by changing the equilibrium position for the new master clock rate. To avoid disturbing the rate-equalizing algorithm, the same value may be added to the $t_k^J$. The same approach may be used to manually insert phase shift in the two pulse trains.

The algorithm may also be used to transform the local time into a common time. If a user wants to know what time it is at absolute time t, the synchronization stack 223 will first read logical clock $t_k(t)$. This value now has to be translated into the common time. Let's assume that the common time is expressed as a number of ticks of the master clock from its start. Even when the two clocks are running at the same rate, to calculate a common time based on a value of logical clock on a slave node k, we still have to know $t0_k$. One may obtain $t0_k$ from equation Eq. 1 with the help of a round-trip algorithm. The round-trip algorithm calculates one-way delay by halving the amount of time it takes a message to travel from node A to node B and back. This approach may not always work because the individual components of the overall message delay may be different for different directions and the simple division by two may cause unacceptable errors. For the two pulse train example used above, it is ineffective to keep jitter due to the clock rate changes down to a 1 µs level if the round-trip calculation will introduce errors on the order of 10 µs because software runs on different processors and sending and receiving the message takes different amount on time even when run on the same hardware.

Another approach for obtaining $t0_k$ is to perform a calibration beforehand by measuring the minimum delay $\Delta t_{N,TS,k,min}$ between the master and a node k using a common timebase to drive both master and slave clocks. The fact that µs in terms of an external time base does not mean a µs in terms of the master clock (in the algorithm we are expressing all time in µs as seen by the master) can be resolved in two ways:

1) The difference may be ignored the difference if precision of the external and master clock crystals multiplied by the minimum delay is less than the target jitter (for example, if the crystals are accurate to 20 ppms, and the minimum message delay is 1 ms, errors will be on the order of 20 ns, i.e., errors should not affect target jitter of 1 µs); and
2) The master timebase may be used as the common timebase for the purpose of the calibration.

Once the $\Delta t_{N,TS,k,min}$ is known, equation Eq. 1 may be used to estimate $t0_k$ by first equalizing the clock rates and then spending predetermined amount of time T tracking the minimum value of D. If a minimum value of D has been measured for the $J^{th}$ message and that the message has been delayed within $\epsilon$ from the minimum delay $\Delta t_{N,TS,k,min}$ and the clock rates are the same, equation Eq. 1 may be rewritten as $$t_k^j = t_{TS}^j + \Delta t_{N,TS,k} + \epsilon - t0_k \qquad \text{Eq. 13}$$

from which $t0_k$ can be estimated to within $\epsilon$. It is obvious that the larger the T, the bigger the chance that one of the messages is going to be delayed with close to minimum delay.

The described calibration procedure may help to achieve the optimum jitter performance. If the procedure cannot be done, one can always step back and use the round-trip approach with the penalty of a decrease in the accuracy. Finally, if one standardizes synchronization on certain types of hardware and network transmission speeds, the calibration may only need to be done as many times as there are different possible configurations. The job gets even simpler if one uses only one standard hardware platform for the time-server, in which case the number of calibrations required becomes equal to the number of different platforms used for the slave nodes. Note that under normal conditions, the minimum delay calibration and synchronization algorithms should work even across switches and routers, the accuracy decreasing as the probability of receiving at least one message having the minimum delay time within each period T grows smaller.

In the described protocol we assumed that the rates of master and slave clocks are similar. Sometimes, however, that may not be the case initially. Under such conditions the control loop may either become unstable or take a long time to drive the slave clock to the set point. A simple estimate of the master clock rate based on larger set of synchronization messages (for example 30 seconds worth of synchronization messages) is an example of a solution of the problem. Once the master rate has been roughly estimated, the control loop may take over and fine synchronize the slave clock to the master clock. The same process may be required if the master clock goes offline and a backup master clock node is not fully synchronized or if the master clock rate changes suddenly. The later may happen if the master clock is being driven by an external timebase that has abruptly changed.

The described protocol and algorithm may be implemented with off-the-shelf communication hardware and on any software platform that supports communication over Ethernet in some embodiments. Various optimizations may improve performance, however. For example, use of a real-time operating system may improve performance in some embodiments by reducing jitter. Positioning synchronization message filter 220 before communication stack 221, as shown on FIG. 6, may also yield smaller jitter than if the message filter 220 is located above the communication stack 221, as shown on FIG. 7. Positioning synchronization message generator block 230 below communication stack 231, as shown on FIG. 9, may yield smaller jitter than if the message generator 230 is located above the communication stack 231, as shown on FIG. 10. A time server equipped with a GPS receiver may synchronize its clock to the global time as shown in FIGS. 8, 9, and 10, which in turn causes all clocks in the distributed C&M system 10 of FIG. 1 to track global time. Since the algorithm only needs one message in each period T to have the minimum delay time, the algorithm works even if multiple synchronization messages are dropped. This also allows the synchronization protocol to be run over public networks. However, a restriction on maximum allowed data bandwidth or use of a private network may reduce jitter. The algorithm may support independent control of common time jitter due to network traffic and temperature changes. The later allows for faster response and recovery to changes in the master clock rate (e.g., such as when crystal oscillators drift due to temperature changes).

Various embodiments may further include receiving, sending or storing instructions and/or data implemented in accordance with the foregoing description upon a computer accessible medium. Generally speaking, a computer accessible medium may include storage media or memory media such as magnetic or optical media, e.g., disk or CD-ROM, volatile or non-volatile media such as RAM (e.g., SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Numerous variations and modifications will become apparent to those skilled in the art once the above disclosure is fully appreciated. It is intended that the following claims be interpreted to embrace all such variations and modifications.

What is claimed is:

1. A system, comprising:
a communication medium;
a master node configured to send a plurality of sets of synchronization messages on the communication medium, and wherein each set of synchronization messages includes a plurality of synchronization messages;
a slave node configured to receive each set of synchronization messages and to select a synchronization message having an optimal delay from each set of synchronization messages;
wherein the slave node is configured to calculate a correction for a slave clock included in the slave node in response to timing information associated with the synchronization message having the optimal delay in each set, wherein the slave node is configured to not calculate a correction for the slave clock in response to timing information associated with at least some of the synchronization messages in each set, and wherein the slave node is configured to calculate the correction to apply to the slave clock by inputting a difference between a master timestamp difference and a slave timestamp difference into a control loop;
wherein the master timestamp difference is a difference between a timestamp included in the synchronization message having the optimal delay selected from a most recently received set and a timestamp included in the synchronization message having the optimal delay selected from a next most recently received set; and
wherein the slave timestamp difference is a difference between a timestamp generated by the slave node in response to receiving the synchronization message having the optimal delay selected from the most recently received set and a timestamp generated by the slave node in response to receiving the synchronization message having the optimal delay selected from the next most recently received set.

2. The system of claim 1, wherein the master node is configured to include a timestamp in each synchronization message in each of the plurality of sets, wherein the timing information includes the timestamp included in the synchronization message having the optimal delay in each set.

3. The system of claim 1, wherein the slave node is configured to generate a timestamp in response to receiving each synchronization message in each of the plurality of sets, wherein the timing information includes the timestamp generated in response to receiving the synchronization message having the optimal delay in each set.

4. The system of claim 1, wherein the slave node is configured to also input a value indicative of a cumulative rate difference to the control loop.

5. The system of claim 1, wherein the slave node is configured to not select a synchronization message as the synchronization message having the optimal delay if the synchronization message has a negative delay and the slave clock is not running more slowly than a master clock included in the master node.

6. The system of claim 5, wherein the slave node is configured to select the synchronization message as the synchronization message having the optimal delay if the synchronization message has a negative delay and the slave clock is running more slowly than the master clock included in the master node.

7. The system of claim 1, wherein the slave node is configured to select the synchronization message having the optimal delay in each set by calculating a delay for each synchronization message in that set;
wherein the slave node is configured to calculate the delay for each synchronization message by calculating a difference between a slave clock time at which the slave node receives that synchronization message and a master clock time at which the master node sends that synchronization message.

8. The system of claim 1, wherein the slave node includes a control loop configured to adjust a rate of the slave clock; and wherein the slave node includes a control loop configured to adjust a phase of the slave clock.

9. The system of claim 8, wherein the slave node is configured to spread an adjustment to the phase of the slave clock over several rate correction cycles in which the rate of the slave clock is adjusted.

10. A method, comprising:
a master node sending a plurality of sets of synchronization messages on a communication medium, wherein each of the plurality of sets includes a plurality of synchronization messages;
a slave node receiving the plurality of sets of synchronization messages from the communication medium;
the slave node selecting a synchronization message having an optimal delay from each of the plurality of sets;
the slave node calculating a correction for a slave clock in response to timing information associated with the synchronization message having the optimal delay in each of the plurality of sets by inputting a difference between a master timestamp difference and a slave timestamp difference into a control loop;
wherein the master timestamp difference is a difference between a timestamp included in the synchronization message having the optimal delay selected from a most recently received set and a master timestamp included in the synchronization message having the optimal delay selected from a next most recently received set;
wherein the slave timestamp difference is a difference between a timestamp generated by the slave node in response to receiving the synchronization message having the optimal delay selected from the most recently received set and a timestamp generated by the slave node in response to receiving the synchronization message having the optimal delay selected from the next most recently received set; and
wherein the slave node does not calculate a correction for the slave clock in response to timing information associated with at least some of the synchronization messages in each set.

11. The method of claim 10, further comprising the master node including a timestamp in each synchronization message in each of the plurality of sets, wherein the timing information includes the timestamp included in the synchronization message having the optimal delay in each set.

12. The method of claim 10, further comprising the slave node generating a timestamp in response to receiving each synchronization message in each of the plurality of sets, wherein the timing information includes the timestamp generated in response to receiving the synchronization message having the optimal delay in each set.

13. The method of claim 10, wherein said calculating the correction comprises the slave node calculating the correction for the slave clock based on a time difference between a time at which the master node sends the synchronization message having the optimal delay in one set and a time at which the master node sends the synchronization message having the optimal delay in a previously received set.

14. The method of claim 10, wherein said calculating the correction comprises the slave node calculating the correction for the slave clock based on a time difference between a time at which the slave node receives the synchronization message having the optimal delay in one set and a time at which the slave node receives the synchronization message having the optimal delay in a previously received set.

15. The method of claim 10, wherein said calculating further comprises inputting a cumulative rate difference to the control loop.

16. The method of claim 10, wherein said selecting comprises the slave node not selecting a synchronization message as the synchronization message having the optimal delay if the synchronization message has a negative delay and the slave clock is not running more slowly than a master clock included in the master node.

17. The method of claim 16, wherein said selecting comprises the slave node selecting the synchronization message if the synchronization message has a negative delay and the slave clock is running more slowly than the master clock included in the master node.

18. The method of claim 10, wherein said selecting comprises the slave node calculating a delay for each synchronization message in each set in order to select the synchronization message having the optimal delay in each set;
wherein said calculating the delay for each synchronization message comprises the slave node calculating a difference between a slave time at which the slave node received that synchronization message and a master time at which the master node sent that synchronization message.

19. The method of claim 10, further comprising the communication medium conveying at least one synchronization message within each of the plurality of sets with a close to minimum delay.

20. The method of claim 10, further comprising the slave node adjusting a rate of the slave clock in response to an output from one control loop and adjusting a phase of the slave clock in response to an output from another control loop.

21. The method of claim 20, further comprising spreading an adjustment to the phase of the slave clock over several rate correction cycles in which the rate of the slave clock is adjusted.

22. The method of claim 10, wherein the communication medium includes an Ethernet communication link.

23. A computer accessible storage medium comprising program instructions computer executable to:
receive a plurality of sets of synchronization messages from a master node via a communication medium, wherein each of the plurality of sets includes a plurality of synchronization messages;
select a synchronization message having an optimal delay from each of the plurality of sets;
calculate a correction for a slave clock in response to timing information associated with the synchronization message having the optimal delay in each of the plurality of sets by inputting a difference between a master timestamp difference and a slave timestamp difference into a control loop implemented by the program instructions;
wherein the master timestamp difference is a difference between a timestamp included in the synchronization message having the optimal delay selected from a most recently received set and a master timestamp included in the synchronization message having the optimal delay selected from a next most recently received set;
wherein the slave timestamp difference is a difference between a timestamp generated by the slave node in response to receiving the synchronization message having the optimal delay selected from the most recently received set and a timestamp generated by the slave node in response to receiving the synchronization message having the optimal delay selected from the next most recently received set; and
wherein the program instructions do not calculate the correction for the slave clock in response to timing information associated with at least some of the synchronization messages in each set.

24. The computer accessible storage medium of claim 23, wherein each synchronization message includes a timestamp indicating a time at which that synchronization message is sent on the communication medium, and wherein the program instructions are computer executable to use the timestamp included in the synchronization message having the optimal delay in each set as part of the timing information.

25. The computer accessible medium of claim 23, wherein the program instructions are computer executable to generate a timestamp in response to receiving each synchronization message in each of the plurality of sets, wherein the timing information includes a timestamp generated in response to receiving the synchronization message having the optimal delay in each set.

26. The computer accessible medium of claim 23, wherein the program instructions are computer executable to not select a synchronization message as the synchronization message having the optimal delay if the synchronization message has a negative delay and the slave clock is not running faster than a master clock to which the slave clock is being synchronized.

27. The computer accessible medium of claim 26, wherein the program instructions are computer executable to select the synchronization message if the synchronization message has a negative delay and the slave clock is running more slowly than the master clock to which the slave clock is being synchronized.

28. The computer accessible medium of claim 23, wherein the program instructions are computer executable to calculate a delay for each synchronization message in each set in order to select the synchronization message having the optimal delay in each set, wherein the delay for each synchronization message equals a difference between a slave time at which the slave node received that synchronization message and a master time at which the master node sent that synchronization message.

29. The computer accessible medium of claim 23, wherein the program instructions are computer executable to implement one control loop that adjusts a rate of the slave clock and to implement another control loop to adjust a phase of the slave clock.

30. A system, comprising:
a communication medium;
a master node configured to send a plurality of sets of synchronization messages on the communication medium, and wherein each set of synchronization messages includes a plurality of synchronization messages;
a slave node configured to receive each set of synchronization messages and to select a synchronization message having an optimal delay from each set of synchronization messages, wherein the slave node is configured to not select a synchronization message as the synchronization message having the optimal delay if the synchronization message has a negative delay and the slave clock is not running more slowly than a master clock included in the master node;
wherein the slave node is configured to calculate a correction for a slave clock included in the slave node in response to timing information associated with the synchronization message having the optimal delay in each set, wherein the slave node is configured to not calculate a correction for the slave clock in response to timing information associated with at least some of the synchronization messages in each set.

31. The system of claim 30, wherein the slave node is configured to calculate the correction for the slave clock based on a time difference between a time at which the master node sends the synchronization message having the optimal delay in one set and a time at which the master node sends the synchronization message having the optimal delay in a previous set.

32. The system of claim 30, wherein the slave node is configured to calculate the correction for the slave clock based on a time difference between a time at which the slave node receives the synchronization message having the optimal delay in one set and a time at which the slave node receives the synchronization message having the optimal delay in a previously received set.

33. The system of claim 30, wherein the slave node is configured to select the synchronization message as the synchronization message having the optimal delay if the synchronization message has a negative delay and the slave clock is running more slowly than the master clock included in the master node.

34. The system of claim 30, wherein the slave node is configured to select the synchronization message having the optimal delay in each set by calculating a delay for each synchronization message in that set;
wherein the slave node is configured to calculate the delay for each synchronization message by calculating a difference between a slave clock time at which the slave node receives that synchronization message and a master clock time at which the master node sends that synchronization message.

35. The system of claim 30, wherein the communication medium is configured to convey at least one synchronization message within each of the plurality of sets with a close to minimum delay.

36. The system of claim 30, wherein the slave node includes a control loop configured to adjust a rate of the slave clock; and wherein the slave node includes a control loop configured to adjust a phase of the slave clock.

37. A method, comprising:
a master node sending a plurality of sets of synchronization messages on a communication medium, wherein each of the plurality of sets includes a plurality of synchronization messages;
a slave node receiving the plurality of sets of synchronization messages from the communication medium;
the slave node selecting a synchronization message having an optimal delay from each of the plurality of sets, wherein said selecting comprises the slave node not selecting a synchronization message as the synchronization message having the optimal delay if the synchronization message has a negative delay and the slave clock is not running more slowly than a master clock included in the master node; and
the slave node calculating a correction for a slave clock in response to timing information associated with the synchronization message having the optimal delay in each of the plurality of sets;
wherein the slave node does not calculate a correction for the slave clock in response to timing information associated with at least some of the synchronization messages in each set.

38. The method of claim 37, further comprising the master node including a timestamp in each synchronization message in each of the plurality of sets, wherein the timing information includes the timestamp included in the synchronization message having the optimal delay in each set.

39. The method of claim 37, further comprising the slave node generating a timestamp in response to receiving each synchronization message in each of the plurality of sets, wherein the timing information includes the timestamp generated in response to receiving the synchronization message having the optimal delay in each set.

40. The method of claim 37, wherein said calculating the correction comprises the slave node calculating the correction for the slave clock based on a time difference between a time at which the master node sends the synchronization message having the optimal delay in one set and a time at which the master node sends the synchronization message having the optimal delay in a previously received set.

41. The method of claim 37, wherein said calculating the correction comprises the slave node calculating the correction for the slave clock based on a time difference between a time at which the slave node receives the synchronization message having the optimal delay in one set and a time at which the slave node receives the synchronization message having the optimal delay in a previously received set.

42. The method of claim 37, further comprising the slave node calculating the correction to apply to the slave clock by inputting a difference between a master timestamp difference and a slave timestamp difference into a control loop;
wherein the master timestamp difference is a difference between a timestamp included in the synchronization message having the optimal delay selected from a most recently received set and a master timestamp included in the synchronization message having the optimal delay selected from a next most recently received set;
wherein the slave timestamp difference is a difference between a timestamp generated by the slave node in response to receiving the synchronization message having the optimal delay selected from the most recently received set and a timestamp generated by the slave node in response to receiving the synchronization message having the optimal delay selected from the next most recently received set.

43. The method of claim 42, wherein said calculating further comprises inputting a cumulative rate difference to the control loop.

44. The method of claim 37, wherein said selecting comprises the slave node selecting the synchronization message if the synchronization message has a negative delay and the slave clock is running more slowly than the master clock included in the master node.

45. The method of claim 37, wherein said selecting comprises the slave node calculating a delay for each synchronization message in each set in order to select the synchronization message having the optimal delay in each set;
wherein said calculating the delay for each synchronization message comprises the slave node calculating a difference between a slave time at which the slave node received that synchronization message and a master time at which the master node sent that synchronization message.

46. The method of claim 37, further comprising the communication medium conveying at least one synchronization message within each of the plurality of sets with a close to minimum delay.

47. The method of claim 37, further comprising the slave node adjusting a rate of the slave clock in response to an output from one control loop and adjusting a phase of the slave clock in response to an output from another control loop.

48. The method of claim 47, further comprising spreading an adjustment to the phase of the slave clock over several rate correction cycles in which the rate of the slave clock is adjusted.

49. The method of claim 37, wherein the communication medium includes an Ethernet communication link.

50. A computer accessible medium comprising program instructions computer executable to:
receive a plurality of sets of synchronization messages from a master node via a communication medium, wherein each of the plurality of sets includes a plurality of synchronization messages;
select a synchronization message having an optimal delay from each of the plurality of sets, and to not select a synchronization message as the synchronization message having the optimal delay if the synchronization message has a negative delay and the slave clock is not running faster than a master clock to which the slave clock is being synchronized;
calculate a correction for a slave clock in response to timing information associated with the synchronization message having the optimal delay in each of the plurality of sets;
wherein the program instructions do not calculate the correction for the slave clock in response to timing information associated with at least some of the synchronization messages in each set.

51. The computer accessible medium of claim 50, wherein the program instructions are computer executable to calculate the correction for the slave clock based on a time difference between a time at which the synchronization message having the optimal delay in one set is sent on the communication medium and a time at which the synchronization message having the optimal delay in a previously received set is sent on the communication medium.

52. The computer accessible medium of claim 50, the program instructions are computer executable to calculate the correction for the slave clock based on a time difference between a time at which the synchronization message having the optimal delay in one set is received and a time at the synchronization message having the optimal delay in a previously received set is received.

53. The computer accessible medium of claim 50, wherein the program instructions are computer executable to select the synchronization message if the synchronization message has a negative delay and the slave clock is running more slowly than the master clock to which the slave clock is being synchronized.

54. The computer accessible medium of claim 50, wherein the program instructions are computer executable to calculate a delay for each synchronization message in each set in order to select the synchronization message having the optimal delay in each set, wherein the delay for each synchronization message equals a difference between a slave time at which the slave node received that synchronization message and a master time at which the master node sent that synchronization message.

55. The computer accessible medium of claim 50, wherein the program instructions are computer executable to implement one control loop that adjusts a rate of the slave clock and to implement another control loop to adjust a phase of the slave clock.

* * * * *